United States Patent
Avery

(10) Patent No.: US 6,704,831 B1
(45) Date of Patent: Mar. 9, 2004

(54) METHOD AND APPARATUS FOR CONVERTING ADDRESS INFORMATION BETWEEN PCI BUS PROTOCOL AND A MESSAGE-PASSING QUEUE-ORIENTED BUS PROTOCOL

(75) Inventor: James M. Avery, Westford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 476 days.

(21) Appl. No.: 09/713,919

(22) Filed: Nov. 16, 2000

(51) Int. Cl.$^7$ .............................................. G06F 13/36
(52) U.S. Cl. ..................................................... 710/310
(58) Field of Search ................................ 710/100, 105, 710/310, 54; 711/159

(56) References Cited

U.S. PATENT DOCUMENTS

| | | | | |
|---|---|---|---|---|
| 5,835,738 A | * | 11/1998 | Blackledge et al. | 710/307 |
| 5,953,511 A | | 9/1999 | Sescila, III et al. | |
| 6,012,120 A | * | 1/2000 | Duncan et al. | 710/308 |
| 6,067,595 A | * | 5/2000 | Lindenstruth | 710/307 |
| 6,173,383 B1 | * | 1/2001 | Casamatta | 711/202 |
| 6,499,074 B1 | * | 12/2002 | Mehta et al. | 710/104 |
| 6,611,883 B1 | * | 8/2003 | Avery | 710/22 |

FOREIGN PATENT DOCUMENTS

EP          0 804 033 A2     10/1997

* cited by examiner

Primary Examiner—Xuan M. Thai
Assistant Examiner—Kim T. Huynh
(74) Attorney, Agent, or Firm—Kudirka & Jobse, LLP

(57) ABSTRACT

PCI load/store operations and DMA operations are implemented via work queue pairs in a message-passing, queue-oriented bus architecture. PCI address space is divided into segments and, each segment, in turn, is divided into regions. A separate work queue is assigned to each segment. A first portion of a PCI address is matched against the address ranges represented by the segments and used to select a memory segment and its corresponding work queue. An entry in the work queue holds a second portion of the PCI address which specifies a region within the selected segment that is assigned to a specific PCI device. In one embodiment, PIO load/store operations are implemented by selecting a work queue assigned to PIO operations and creating a work queue entry with the PCI address of a register on a PCI device and a pointer to the PIO data. The work queue entry is sent to a PCI bridge where the PCI address is extracted and used to program the appropriate device register with the data using the data pointer. DMA transfers are also implemented by selecting a work queue by means comparing a portion of the PCI address generated by the PCI device to an address range table and selecting a work queue that services the address range. A work queue entry is created with the remainder of the PCI address and a pointer to the DMA data. An RDMA operation is used to perform the DMA transfer. The page and region data is used in connection with a translation protection table in the host channel adapter to access physical memory and perform the DMA transfer.

24 Claims, 18 Drawing Sheets

METHOD AND APPARATUS FOR CONVERTING ADDRESS INFORMATION BETWEEN PCI BUS PROTOCOL AND A MESSAGE-PASSING QUEUE-ORIENTED BUS PROTOCOL

RELATED APPLICATIONS

The following applications contain subject matter that is related to the subject disclosed and claimed in the present application: application Ser. No. 09/713,913, entitled METHOD AND APPARATUS FOR SYNCHRONIZING INTERRUPTS IN A MESSAGE PASSING QUEUE ORIENTED BUS SYSTEM, filed by the present inventor on an even date herewith and assigned and application Ser. No. 09/713,917, entitled METHOD AND APPARATUS FOR IMPLEMENTING PCI DMA SPECULATIVE PREFETCHING IN A MESSAGE PASSING QUEUE ORIENTED BUS SYSTEM, filed by the present inventor on an even date herewith and assigned.

FIELD OF THE INVENTION

This invention relates to methods and apparatus for interconnecting a PCI bus structure to a bus structure involving message passing and work queues.

BACKGROUND OF THE INVENTION

In conventional computer systems, various components, such as CPUs, memory and peripheral devices, are interconnected by a common signal transfer path called a "bus". Busses are implemented in a variety of well-known standard architectures, one of which is called the PCI (Peripheral Component Interconnect) architecture. In its basic configuration, a PCI bus has a bus width of 32 or 64 bits, operating clock speeds of 33 or 66 MHz, and a maximum data transfer speed of 132 MBps for 33 MHz operation and 566 MBps for 66 MHz operation. In accordance with PCI protocol, address and data are multiplexed so that address lines and data lines do not have to be separated. This multiplexing reduces both the number of signals required for operation and the number of connection pins required to connect PCI compatible devices to the bus. In the larger bus capability, there are 64 bus lines and, thus, 64 bits available for both address and data. PCI devices use a paged memory access scheme where each PCI address consists of a page number field and a page offset field and each PCI device can directly access a 4GB address space.

PCI bus technology uses memory mapped techniques for performing I/O operations and DMA operations. In accordance with this technique, within the physical I/O address space of the platform, a range of addresses called a PCI memory address space is allocated for PCI devices. Within this address space there is a region reserved by the operating system for programmable I/O (PIO) operations that are performed by the host to read or change the contents of the device registers in the associated PCI devices. The host performs the read and write operations in the kernel virtual address space that is mapped into the host physical address space. Within the region, separate addresses are assigned to each register in each PCI device. Load and store operations can then be performed to these addresses to change or read the register contents.

A separate region is also allocated by the operating system for DMA access to host memory by the PCI devices. The allocated addresses are dynamically mapped to a section of the host physical memory. During this mapping, an address translation is performed to translate the addresses generated by the PCI devices into addresses in the host physical memory that may have a different address size that the PCI addresses. This address mapping is accomplished via a number of conventional mechanisms including translation lookaside buffers and memory management units.

The PCI device then uses the mapped addresses to perform DMA operations by directly reading and writing in with the mapped addresses in the PCI address space. The host may also access these memory locations by means of the kernel virtual address space that is mapped by another memory management unit into the host physical memory. Details of the structure of the PCI bus architecture and of its operation are described in "PCI Local Bus Specification, Revision 2.2" (Copyright 1998) which publication is incorporated by reference herein in its entirety.

In addition to the PCI bus architecture, there are also other well-known bus architectures. For example, other architectures include Fibre Channel and more recently, Infini-Band$^{SM}$ architecture. These architectures are not memory-mapped architectures. Instead, the host and its memory are connected to host channel adapters. The input/output (I/O) devices are connected to target channel adapters. The host and target channel adapters communicate by messages comprising one or more data packets transmitted over serial point-to-point links established via a hardware switch fabric to which the host and target channel adapters are connected. The messages are enqueued for delivery between the channel adapters.

Data packet transmission is controlled by instructions generated by the host and I/O devices and placed in queues called work queues. Each work queue pair includes a send queue and a receive queue. The send queue can receive instructions from one process and the instructions cause data to be sent to another process. The receive queue can receive instructions which specify to a process where to place data received from another process. Hardware in the respective channel adapter processes instructions in the work queues and, under control of the instructions, causes the data packets to be transferred between the CPU memory and the I/O devices. A form of direct memory access (DMA) called remote direct memory access (RDMA) can also be performed by instructions placed in the work queues. This architecture has the advantage that it decouples the CPU memory from the I/O system and permits the system to be easily scaled.

As attractive as the newer bus architectures are, there are many existing PCI peripherals that will require accommodation in such architectures for a considerable period of time. Therefore, there exists a need for a mechanism to interconnect a PCI bus to the message-passing, queue-oriented architectures described above so that PCI peripherals can be used with the newer architecture. Such a mechanism is called a bridge and must meet certain criteria, such as the preservation of PCI ordering rules and address translation. In addition, PCI services must be implemented. For example, there must be a DMA mapping mechanism that allows the PCI devices to perform DMA operations. In addition, the aforementioned load/store operations must be accommodated. Other criteria, such as interrupt support must also be provided. It is also desirable to maximize the information transfer rate through such a bridge. However, the packetized data and instruction queues of the message-passing, queue-oriented architecture are not directly adaptable to meet the PCI memory mapped addressing requirements.

Therefore, there is a need to accommodate PCI peripherals in a computer system that uses a message-passing bus architecture and to perform the address mapping and translation that would conventionally be performed by an I/O memory management unit.

SUMMARY OF THE INVENTION

In accordance with one aspect of the invention, PCI load/store operations and DMA operations are implemented via work queue pairs. PCI address space is divided into segments and, each segment, in turn, is divided into regions. A separate work queue is assigned to each segment. A first portion of a PCI address is matched against the address ranges represented by the segments and used to select a memory segment and its corresponding work queue. An entry in the work queue holds a second portion of the PCI address which specifies a region within the selected segment that is assigned to a specific PCI device. The work queue entry may also hold other information such as the size of the data to be transferred and a pointer which identifies where the data packets containing the actual data to be transferred are located.

In one embodiment, PIO load/store operations are implemented by selecting a work queue assigned to PIO operations and creating a work queue entry with the PCI address of a register on a PCI device and a pointer to the PIO data. The work queue entry is sent to the bridge where the PCI address is extracted and used to program the appropriate device register with the data using the data pointer.

In another embodiment, PIO load/store operations are implemented by selecting a work queue assigned to PIO operations and creating a work queue entry with the PCI address of a register on a PCI device and a pointer to the PIO data. An RDMA operation is used to perform the PIO load/store processes. The page and region data is used in connection with a translation protection table in the host channel adapter to access physical memory and perform the PIO operation.

In yet another embodiment, DMA transfers are implemented by selecting a work queue by means comparing a portion of the PCI address generated by the PCI device to an address range table and selecting a work queue that services the address range. A work queue entry is created with the remainder of the PCI address and a pointer to the DMA data. An RDMA operation is used to perform the DMA transfer. The page and region data is used in connection with a translation protection table in the host channel adapter to access physical memory and perform the DMA transfer.

BRIEF DESCRIPTION OF THE DRAWINGS

The above and further advantages of the invention may be better understood by referring to the following description in conjunction with the accompanying drawings in which.

DETAILED DESCRIPTION

Figure 1:
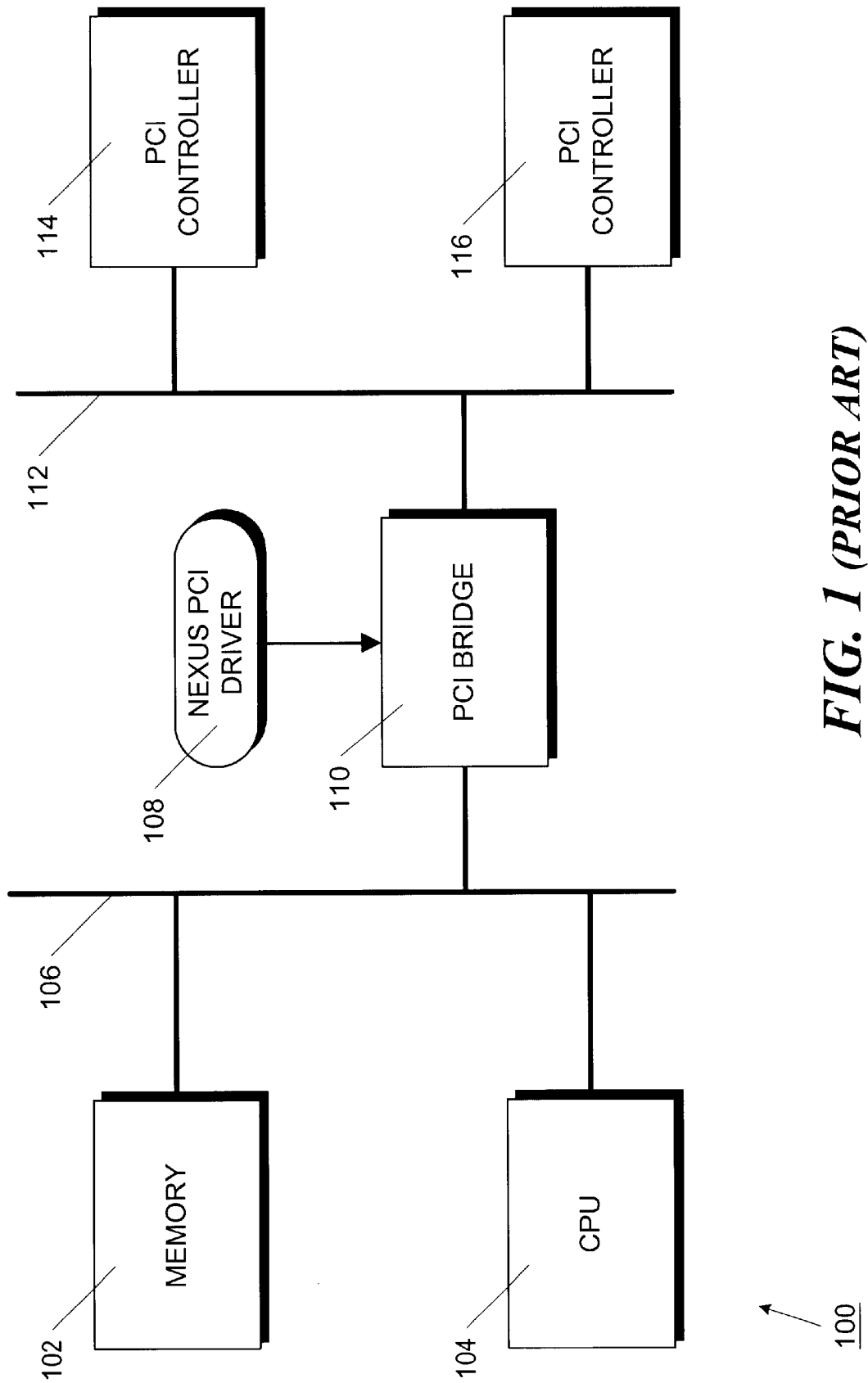
FIG. 1 is a block schematic diagram of a conventional computer platform illustrating the logical hardware topology including a PCI bus.

In the following description, the conventional PCI system will first be described followed by a descriptions of the implementation of such a system in an InfiniBandsM architecture. A schematic block diagram illustrating the logical hardware topology of a prior art computer system including a PCI bus is shown in FIG. 1. As an example, a platform running the Solaris® operating system developed and sold by Sun Microsystems, Inc. is shown. However, those skilled in the art would realize that other platforms could also be used without departing from the spirit and scope of the invention. In accordance with its normal operation, the Solaris I/O framework builds an internal hierarchical data structure called a "device tree" consisting of a set of device nodes that are interconnected to form a tree that mimics the organization of the hardware viewed as interconnected buses and their attached devices. In FIG. 1, the computer system is represented as a memory interconnect bus 106 that is connected to PCI bus 112 by PCI bridge 110. The memory interconnect bus 106 has two devices, the CPU 104 and the memory 102. The PCI bus 112 also has two connected devices, PCI controller 114 and PCI controller 116.

In this model, a device node that represents a bus is bound to bus driver software called a "nexus" driver. Nexus driver software provides services to the Solaris operating system, which services include performing bus-specific device discovery, initializing devices, and translating physical addresses. Driver software is available commercially for a PCI bus from a number of companies. A nexus driver 108 is associated with the PCI bridge 110 as shown in FIG. 1.

Figures 2, 5B:
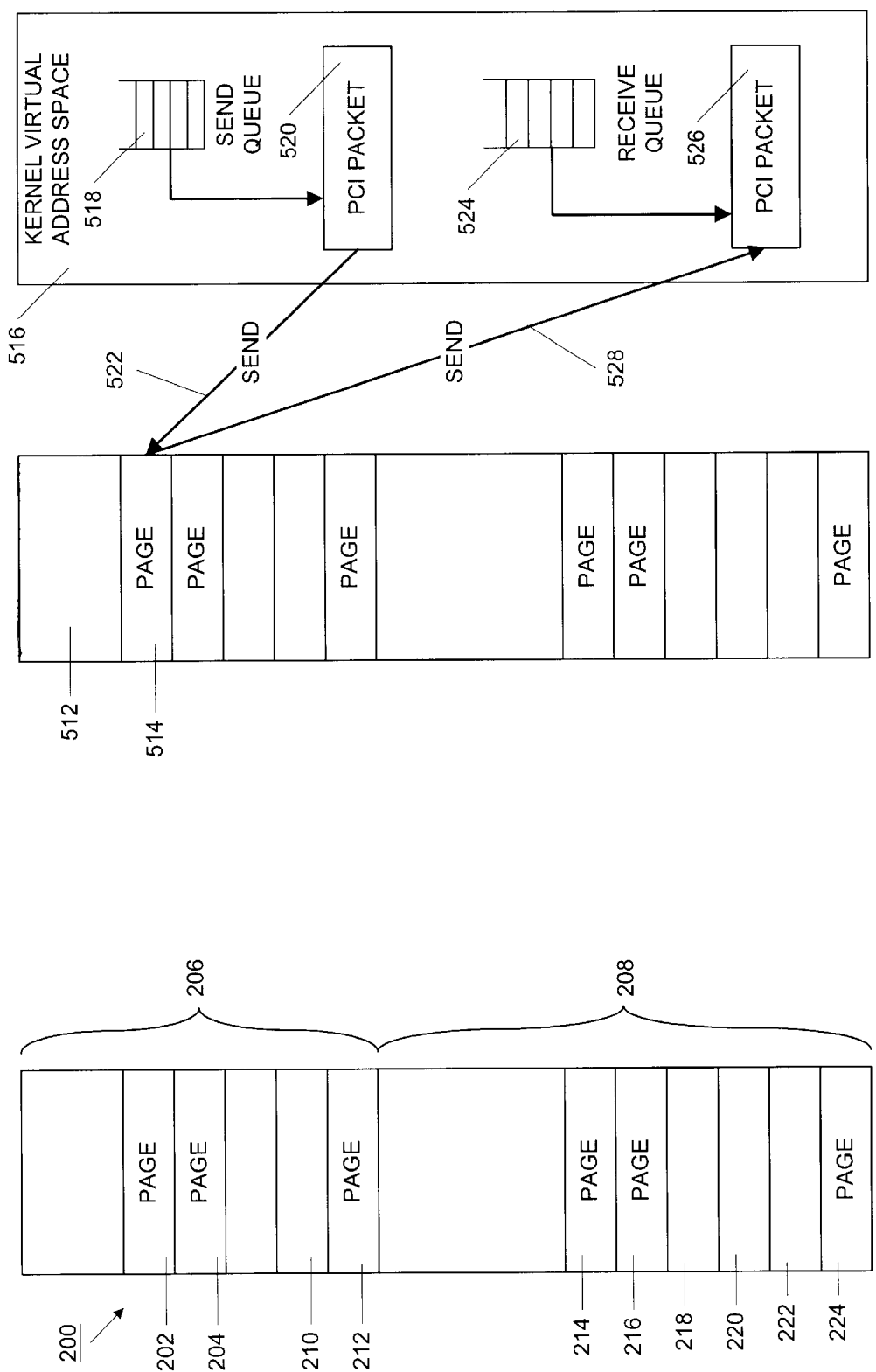
FIG. 2 is a block schematic diagram of a conventional memory mapping arrangement of a conventional PCI device.
FIG. 5B is a block schematic diagram illustrating PIO writes and reads to the PCI address space.

FIG. 2 illustrates how a conventional PCI memory address space 200 is partitioned by the Solaris operating system within the space reserved for a single PCI bus 112 in a paged memory system. There is a region 206 reserved for PIO access from the host 104. This size of this region 206 is based on the sum of the memory requirements exported by the BARs of the individual devices 114 and 116 connected to that PCI bus 112. A similar allocation (not shown) may be built for PCI I/O space and PCI configuration (config) space for PIO accesses. The size of the region 206 is adjusted as devices are added and removed from the PCI bus 112.

There is a separate, non-overlapping region 208 within the PCI bus address space 200 reserved for mapping DMA accesses to host memory 102 from the PCI devices 114 and 116. On the illustrative platform, this range 208 of PCI addresses is mapped into host memory 102 through an I/O memory management unit (IOMMU.) The amount of memory in region 208 mapped at any given point in time is based on the DMA activity of the devices 114 and 116 on the PCI bus 112. If there are many I/O requests outstanding, a large DMA space will be allocated in this region 208.

In the illustrative system, there is no requirement that the PIO region 206 and the DMA region 208 be contiguous in PCI memory space 200 although they are illustrated this way in FIG. 2. The PIO and DMA regions, 206 and 208, never share the same page, so each region is always a multiple of the host page size. Furthermore, the PCI memory allocation algorithm reserves space for each device such that no two devices share the same page in the PIO region 206 and the DMA region 208. For example, pages 202 and 204 in the PIO region 206 might be assigned to a PCI device A, whereas pages 210 and 212 may be assigned to device B. Similarly, Pages 214–218 in the DMA region 208 might be assigned to PCI device A and pages 220–224 assigned to device B.

For load and store operations, depending on the platform, the operating system may issue appropriate processor instructions to access the PCI address space. On other platforms, the processor uses addresses in a kernel virtual address space. These addresses are mapped into a physical address space in the platform memory by a memory management unit. Similarly, processor-generated load/store operations are decoded by the PCI bridge controller mapped into the appropriate PCI cycles based on the address region.

For DMA operations, the exact address translation mechanism depends on the platform. For example, on Sun platforms, the PCI bridge hardware 110 supports a I/O memory management unit (IOMMU) that translates a PCI address generated by the PCI device into a host memory physical address. Another memory management unit translates the kernel virtual address space into the host physical memory addresses.

The PCI address consists of two fields: page number and page offset. Page offset stays the same from PCI address to host memory physical address. In systems where the address size differs from the PCI address size an address translation must be performed. For example, in Sun system mentioned above uses a 41-bit physical address size. Consequently, the 32-bit address size generated by the PCI devices must be converted or resolved to generate the physical address. The conversion of the PCI address is carried out by the IOMMU, which may use a conventional translation lookaside buffer to accelerate the conversion. In addition, a DMA region allocated to a particular device may have special properties called consistent and streaming mode.

Figure 3:
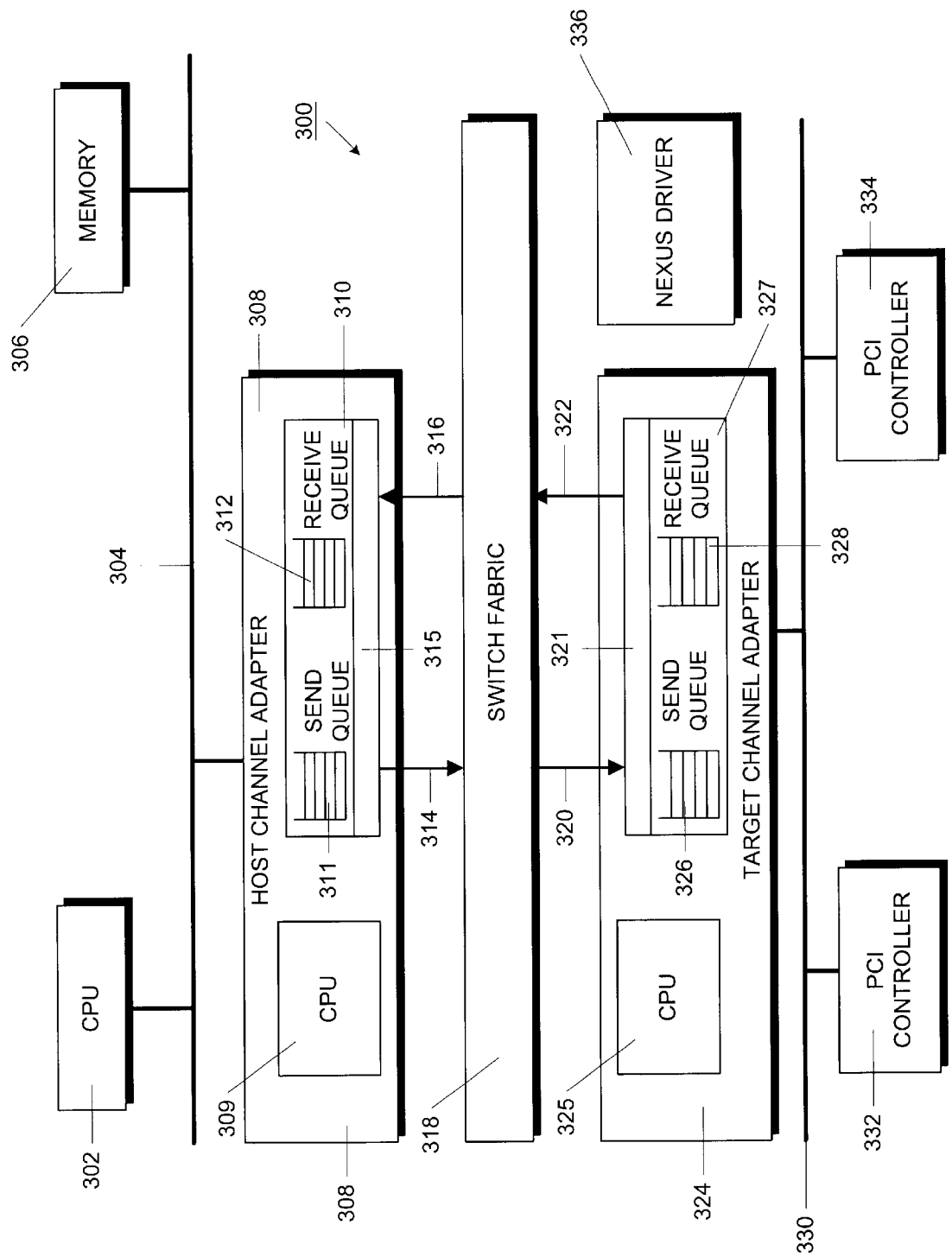
FIG. 3 is a block schematic diagram of an InfiniBand[SM] bus architecture showing work queue pairs that are used to send and receive messages.

Other platforms don't support any indirect mapping and rely on PCI devices to support scatter/gather DMA operation. FIG. 3 illustrates, in block schematic form, a message passing queue-oriented bus architecture with an attached PCI bus. In this figure and the discussion that follows, the InfiniBand$^{SM}$ architecture is used as an illustration of such a system. However, it will be apparent to those skilled in the art that the principles of the invention are applicable to other similar systems that use the same message passing queue-oriented architecture. The InfiniBand system 300 shown in FIG. 3 has a memory interconnect bus 304 that connects CPU 302 and memory 306. The memory interconnect bus 304 is, in turn, connected to a host channel adapter (HCA) 308 that includes its own CPU 309 and memory 311. Other HCAs (not shown) may also exist in a conventional Infini-Band system, but have been omitted for clarity. In general, the HCA 308 communicates with the memory 306 by means of physical memory addresses. In order to permit operation with virtual memory addresses, the HCA 308 maintains a Translation & Protection Table (TPT) that it uses to translate virtual addresses to physical addresses and to validate access rights to the memory 306.

The HCA 308 is connected to a switch fabric 318 for both sending and receiving data as indicated schematically by arrows 314 and 316. The HCA 308 can be connected to any number of peripheral busses via the switch fabric 318. In particular, the HCA 308 can be connected to various PCI peripherals, of which two, 332 and 334 are shown, via a PCI bus 330, by means of a target channel adapter (TCA) 324. In this case, the TCA 324 is an InfiniBand to PCI bridge (IB-PCI bridge) and can both send and receive data as indicated schematically by arrows 320 and 322. The TCA 324 also includes a CPU 325 and a memory 327. Other TCAs (not shown) may also be present.

Clients of both the HCA 308 and the TCA 324 can control data transfer by creating a facility called a work queue. Each client has its own set of work queues, comprising one or more work queues, and each pair of work queues is independent from the other work queues. Work queues are always created in pairs; one for send operations and one for receive operations. In general, the send work queue holds instructions that cause data to be transferred between a client's memory and another process's memory, and the receive work queue holds instructions that instruct the client where to place data that is received from another process. For example, HCA 308 has a work queue pair consisting of send queue 310 and receive queue 312. Similarly, TCA 324 has a work queue pair consisting of send queue 326 and receive queue 328. Although only two queue pairs are shown, typically each client would create many more work queue pairs in order to conduct its operation. In order to use the work queue pair, a client submits a work request to its respective channel adapter and the work request causes an instruction called a Work Queue Element (WQE) to be placed on the appropriate send work queue.

There are several classes of send queue operations, including SEND operations and RDMA operations. For a SEND operation, the WQE specifies a block of data in the client's memory space for the hardware to send to the destination. At the destination, a corresponding alreadyqueued receive WQE in a receive queue specifies where to place that data. For an RDMA operation, the WQE specifies a block of data to be sent and specifies the address at the destination where the data is to be placed. Thus, an RDMA operation does not need to involve the receive work queue of the destination.

RDMA operations include RDMA-WRITE and RDMA-READ. The RDMA-WRITE operation stipulates that the hardware is to transfer data from the client's memory to the remote process's memory. The RDMA-READ operation stipulates that the hardware is to transfer data from the remote memory to the client's memory.

Both the host and channel adapter hardware comprise a transport engine that executes WQEs in the order that they were placed on the send work queue. For example, host channel adapter 308 includes transport engine 315 and target channel adapter 324 includes transport engine 321. In the process of sending data, the transport engine in the source channel adapter interprets the WQE in its send queue and creates a request message, which includes the data, to send to the destination channel adapter. The transport engine segments the message into multiple packets if necessary, adds the appropriate routing headers, and sends the packet out.

When the destination receives a packet, its transport engine associates the received packet with a particular work queue pair and uses the context of that work queue pair to process the packet and execute the operation. If necessary, the destination transport engine creates an acknowledgment message and sends that message back to the source channel adapter.

The structure and operation of the InfiniBand$^{SM}$ system are described in detail in the InfiniBand Specification Rev 0.9, The InfiniBand$^{SM}$ Trade Association (2000) which specification is incorporated by reference herein in its entirety.

A nexus driver 336 written for the IB-PCI bridge 324 has procedures that map operating system functions into Infini-Band operations. In particular, as discussed in detail below, host load/store operations are implemented as InfiniBand SENDs or RDMA-WRITES and PCI device DMA read/write operations are implemented as InfiniBand RDMA-READ/RDMA-WRITE operations. The IB-PCI nexus driver 336 is similar to that used for other InfiniBand devices. Specifically, the conventional InfiniBand device configuration framework will discover the IB-PCI bridge device 324 using Device Management Class MADs.

The IB-PCI bridge 324 exports enough information, such as service IDs for configuration, hotplug, and memory mapping, to enable the operating system InfiniBand device framework to create a device node as discussed above and to bind the appropriate device driver. In particular, the IB-PCI nexus driver 336 must discover the service ID for communication with the IB-PCI bridge 324 and the number of queue pairs necessary to support PIO operations and DMA transfers, as discussed below. This latter number may vary because a queue pair may be allocated for configuration; memory or I/O space and each queue pair may map to one or more pages. In addition, queue pairs may be allocated for feature support such as pre-fetching capability and service IDs needed to access IB-PCI bridge resources. Finally, if the IB-PCI bridge can become the target of RDMA-READs, queue pairs may be allocated based on the number of outstanding RDMA-READs supported. In any case, the IB-PCI nexus driver 336 uses the information obtained from the device 336 to determine the number of queue pairs assigned. The nexus driver allocates ranges of PCI memory and I/O space. The location of the PCI devices in configuration space may be set by the IB-PCI bridge hardware 324 or be made programmable so that the nexus driver may setup the bus, via configuration operations.

Since the PCI address space and the kernel virtual address space are not directly linked, the IB-PCI nexus driver does not reserve any kernel address space for PCI operations. Instead, during initialization, the nexus driver 336 will create a queue pair, called a command queue pair, and establish a connection for sending control messages from the host CPU 302 to the IB-PCI bridge 324. These control messages enable device-specific message transfer for establishing initial setup using the aforementioned information obtained from the IB-PCI bridge 324. The nexus driver 336 may also allocate all the PCI memory types for PIO operations initially.

Figure 4:
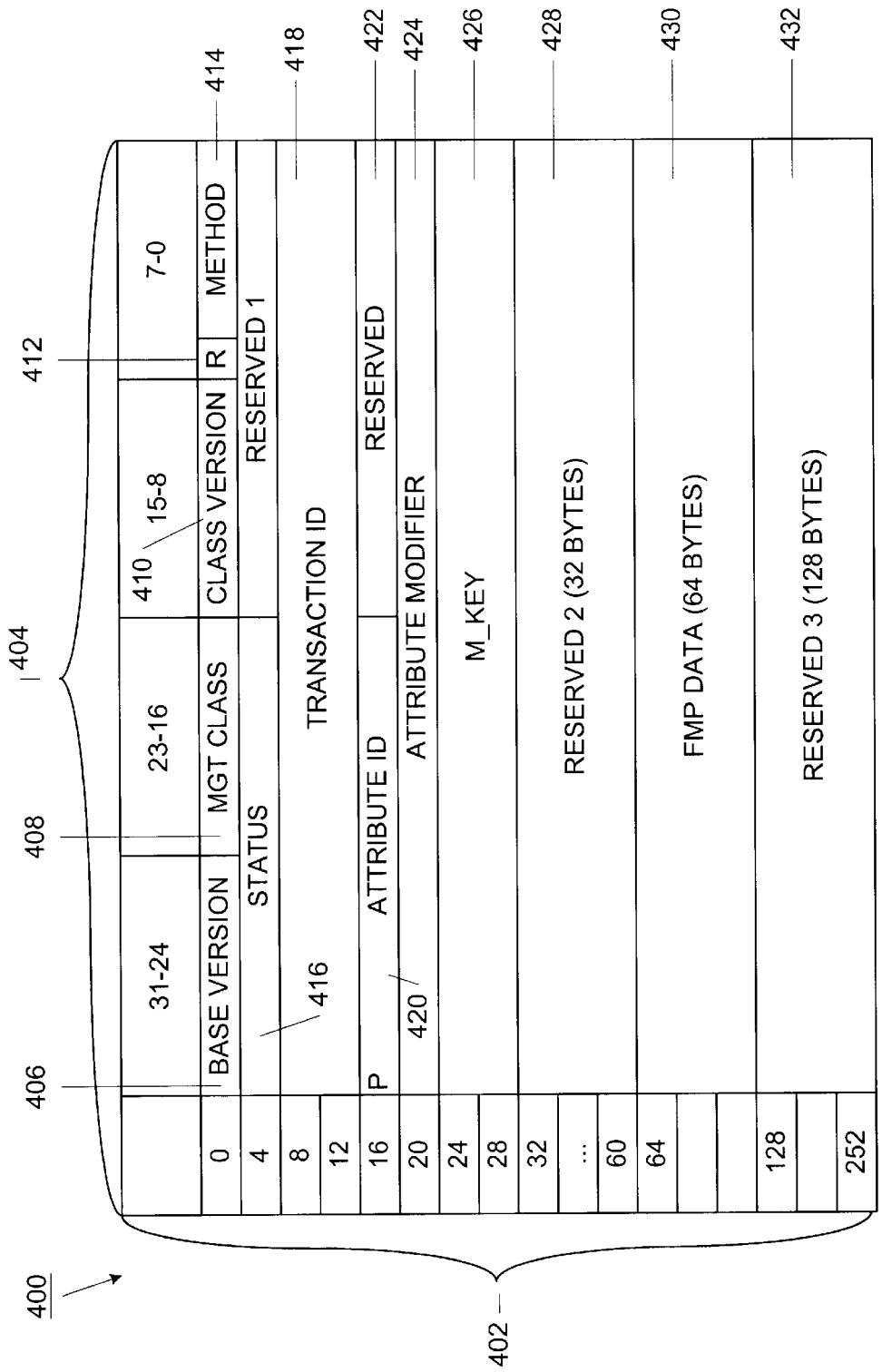
FIG. 4 is a schematic diagram of a data packet used to send information over the InfiniBand bus.

An InfiniBand data packet is used to send requests to the IB-PCI bridge 324 and to access the remote address space of a target PCI device. A general format of this data packet is shown in FIG. 4. The packet 400 consists of 253 32-bit words 402. In FIG. 4, the bits 404 in each of the words 402 are shown across the top of FIG. 4. Each word consists of four bytes. The first word consists of five sections: a one-byte base version identifier 406, a one-byte management class identifier 408, a one-byte class version identifier 410, a reserved bit 412 and a method identifier 414, which together comprise the last byte. The second word comprises a two-byte status code. The remainder of the second word comprises an area 417 reserved for future use (Reserved 1). The next two words are composed of an eight-byte transaction ID 418.

Following the transaction ID 418 is a word that consists of a two-byte attribute ID 420 and a reserved area 422. Next, a four-byte attribute modifier area 424 is contained in the data packet 400. The attribute modifier 424 is followed by an eight-byte M-key 426 that, in turn, is followed by a 32-byte reserved area 428. Next, an FMP data area 430 of 64 bytes is included. The last 128 bytes 432 of the data packet 400 are reserved.

In accordance with one aspect of the present invention, PCI programmed I/O (load and store) operations are performed as follows. The InfiniBand-PCI bridge nexus driver may have multiple device drivers communicating with it. In order to satisfy requests from these drivers, the nexus driver may multiplex requests from the drivers over a single InfiniBand queue pair. In the process of this multiplexing, the nexus driver may order requests from each of the device drivers, but will not order requests between device drivers. In the process of performing PIO, the device drivers perform "get" and "put" subroutines to change the contents of device registers for the associated PCI devices. These subroutines are implemented by software provided by the parent nexus driver as a combination of SENDs over the InfiniBand system. A type of service called "Reliable Connection" service is used in which a queue pair in the HCA is uniquely associated with a queue pair in the InfiniBand-PCI bridge so that requests sent from the HCA queue pair are always transmitted to the associated queue pair in the bridge. This type of service also requires that the destination channel adapter return an acknowledgement to the source channel adapter.

Figure 5A:
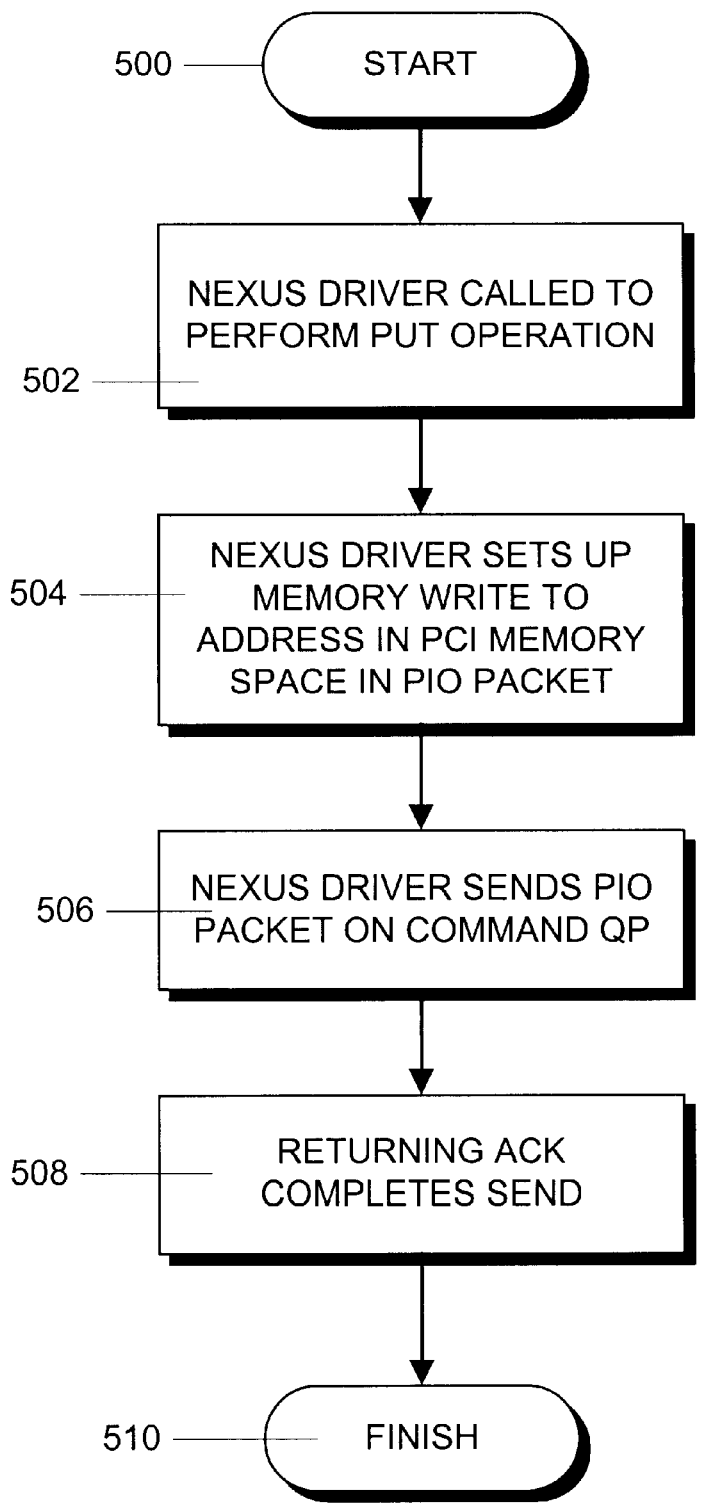
FIG. 5A is a flowchart illustrating steps performed by software during a PIO write to a PCI device register using an InfiniBand SEND operation.

More particularly, a device driver will request a PIO write operation by performing a put of a byte (8 bits), word (16 bits), long (32 bits), or longlong (64 bits) to a register on a selected PCI device. In response, the overall sequence of operations performed by the inventive InfiniBand-PCI bridge is illustrated in FIGS. 5A and 5B. This sequence begins in step 500 and proceeds to step 502 in which the nexus driver is called to perform the put operation. In step 504, the nexus driver sets up a memory write to the appropriate address in PCI memory space by creating a PIO packet of the form shown in FIG. 4 with the data to be written into the register and embedding the PCI address in the send work queue entry.

Next, as indicated in step 506, the nexus driver performs a SEND of the PIO packet using the command queue pair. The acknowledgement (ACK) of the SEND operation returning from the InfiniBand-PCI bridge results in a completion indication of the SEND. The process then finishes in step 510.

The write process is illustrated in FIG. 5B. The device driver (not shown) creates a PIO data packet with the data to be written into the register. This data packet schematically shown as packet 520 can be of the form shown in FIG. 4. The driver then creates a WQE in the send queue 518 in the kernel address space 516. The WQE contains as an embedded address the address of the PCI register. When the WQE is processed, it creates a request containing the embedded address and the PIO data packet.

The request is then sent to a specific receive queue in the InfiniBand-PCI bridge which is associated with the send queue in the HCA at the time the queues are created. The receive queue in the bridge has been set up to perform a write operation and the address of the PCI bus is placed in an entry on the receive work queue. The bridge then writes the received data, including the embedded PCI address and the register data, to the PCI bus. Consequently, the data packet is sent as indicated schematically by arrow 522 to an address 514 in PCI address space 512 that corresponds to the desired PCI device register.

Figure 6A:
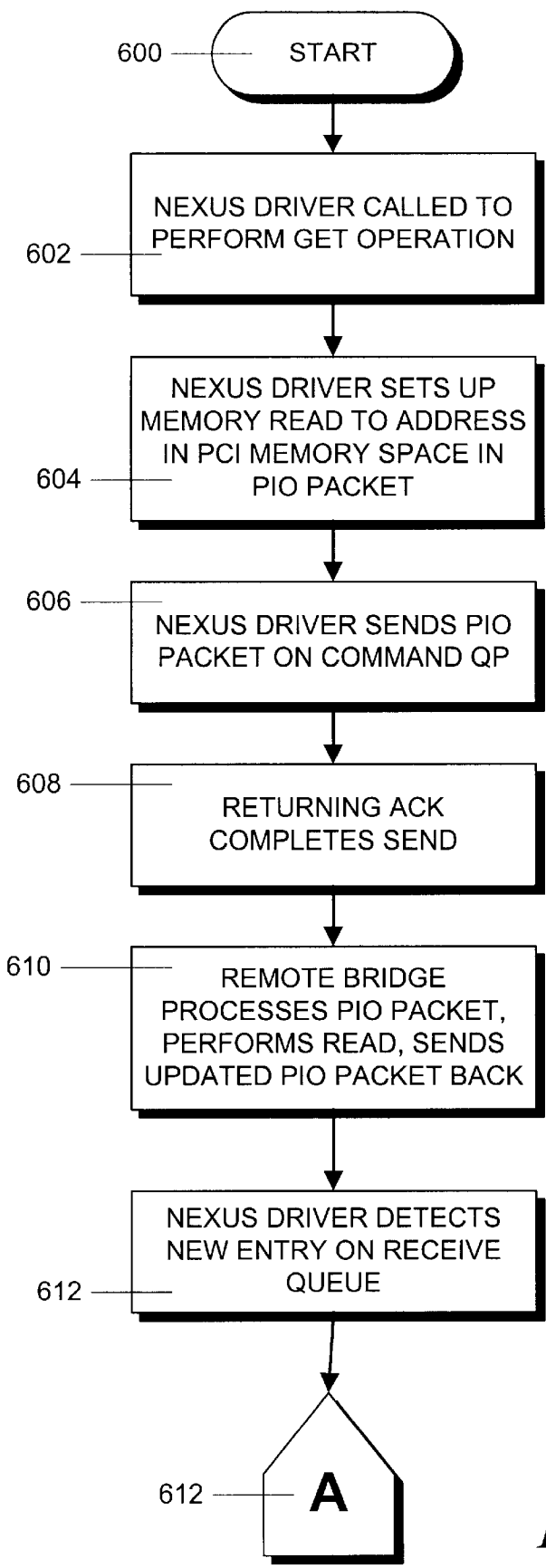
FIGS. 6A and 6B, when placed together, form a flowchart illustrating steps performed by software during a PIO read from a PCI device register using InfiniBand SEND operations.
Figure 6B:
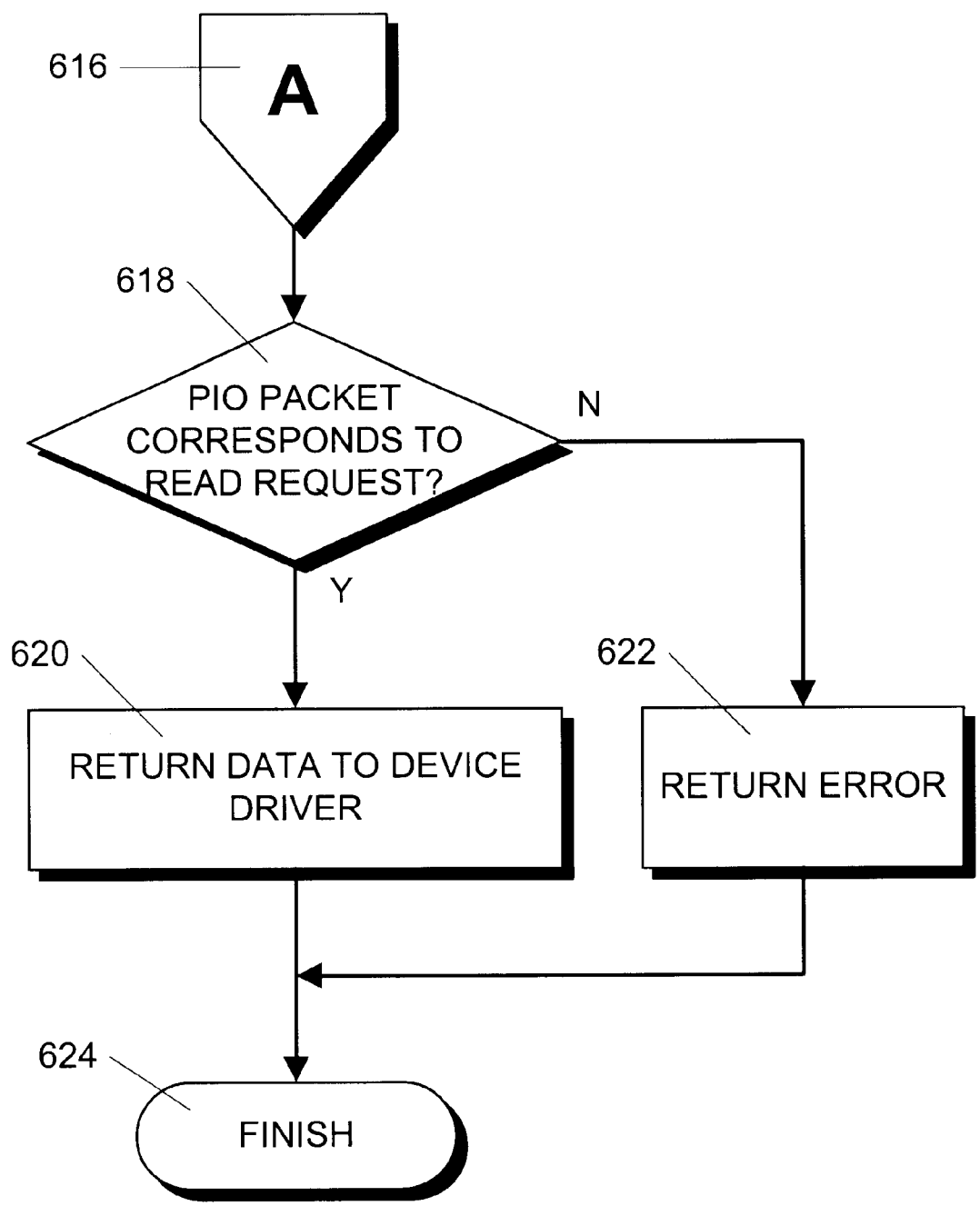

A device driver will request a PIO read operation by performing a get from a register on the device. This results in the process illustrated in FIGS. 6A and 6B and starts in step 600. In step 602, the nexus driver is called to perform the get operation. In step 604, the nexus driver sets up a memory read of the appropriate address in PCI memory space by creating a PIO packet (without data) and embedding the PCI address in a work queue entry on the send queue of the HCA command queue pair. The nexus driver then performs a SEND of the PIO packet using the command queue pair (step 606.) In step 608, the ACK of the operation results in a completion indication of the SEND.

Next, in step 610, the InfiniBand-PCI bridge receives and processes the request, performs the read operation using the embedded address. It then updates the PIO packet by inserting the data read from the PCI register, and then SENDs the updated PIO data packet with the PCI register data back to the HCA. In step 612, the nexus driver detects a new entry on the receive queue of the HCA command queue pair.

The process then proceeds, via off-page connectors 614 and 616, to step 618 where the nexus driver checks the PIO packet of the detected new entry to determine whether it corresponds to the read request issued earlier. If it does, the process proceeds to step 620 in which the received data is returned to the device driver. Alternatively, if in step 618, the new entry does not correspond to the earlier read request, then an error is returned in step 622. In either case, the process ends in step 624.

The read process is also illustrated in FIG. 5B. The device driver (not shown) creates a PIO data packet 520 which does not incorporate register data and embeds an address in the PCI address space 512 in a WQE on the send queue 518 of the HCA command queue pair in the kernel address space 516. This data packet schematically shown as packet 520 can be of the form shown in FIG. 4. The driver then creates a WQE in the send queue 518 in the kernel address space 516. The WQE contains as an embedded address the address of the PCI register. When the WQE is processed, it creates a request containing the embedded address and the PIO data packet.

The request is then sent to a specific receive queue in the InfiniBand-PCI bridge which is associated with the send queue in the HCA at the time the queues are created as indicated schematically by arrow 522. The receive queue in the bridge has been set up to perform a read operation and the address of the PCI bus is placed in an entry on the receive work queue. The bridge then performs a PCI read to the embedded PCI address on the PCI bus.

The InfiniBand-PCI bridge receives the requested PCI register data from the PCI bus and updates the PIO packet received from the HCA by inserting the register data. It then places a WQE on its send queue which causes a request containing the PIO data to be sent to the receive queue of the HCA command queue pair as indicated schematically by arrow 528. The nexus driver detects a new entry on the receive queue 524 of the HCA command queue pair in the kernel address space 516. The nexus driver checks the PIO packet 526 of the detected new entry to determine whether it corresponds to the read request issued earlier. If it does, the received data is returned to the device driver.

Implementations of the PIO read and write operations are shown in FIGS. 7–13. Two mechanisms can be used to implement PIO reads and writes. PIO writes can use either the InfiniBand SEND mechanism shown in FIGS. 7 and 8 or the InfiniBand RDMA-WRITE operation shown in FIGS. 9 and 10 to write to PCI Memory, I/O and config address spaces. PIO reads use the InfiniBand RDMA-READ mechanism illustrated in FIGS. 11, 12 and 13. In both cases, an address is extracted from the lower 32 bits of the InfiniBand data packet address and used as the PCI address. This mechanism disambiguates the PCI address spaces for memory, I/O and config address spaces.

PIO read/write operations to PCI device resources which are mapped into PCI I/O space need special attention because PIO accesses to PCI device controller registers can have unexpected effects. For example, if an InfiniBand RDMA mechanism were used to access PCI I/O space, there are situations where an acknowledgement to an RDMA read/write access request does not occur. If such a condition happens, and the RDMA access request is repeated, the device might return a different result (interrupts bits can be cleared when read, etc.) the second time the RDMA access is attempted. In order to prevent this situation, in accordance with a preferred embodiment, PIO operations are required to use InfiniBand SEND operations, rather than RDMA-WRITE operations to perform an access to PCI I/O address space.

Furthermore, the InfiniBand-PCI bridge is required to save the state of a previous device RDMA-READ result until the RDMA process completes successfully. This insures that (1) any device I/O space access unexpected effects are prevented from propagating up through the InfiniBand switch fabric and reporting false conditions of the accessed device and (2) the last accessed device state is preserved for proper InfiniBand transit and error recovery, should it be required.

Figure 7:
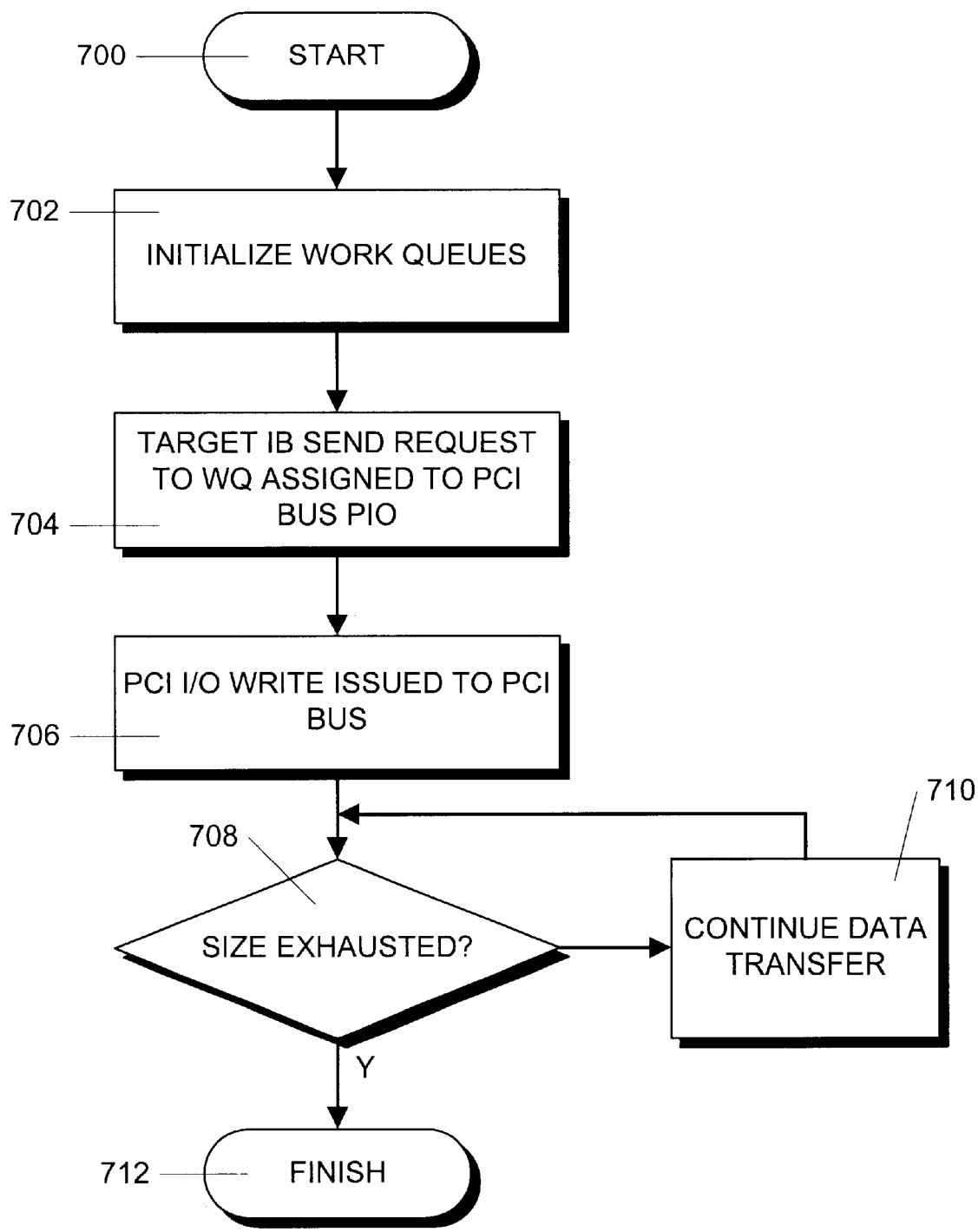
FIG. 7 is a flowchart illustrating the implementation of a PIO write to a PCI device register using work queue entries to perform an InfiniBand SEND operation.
Figure 8:
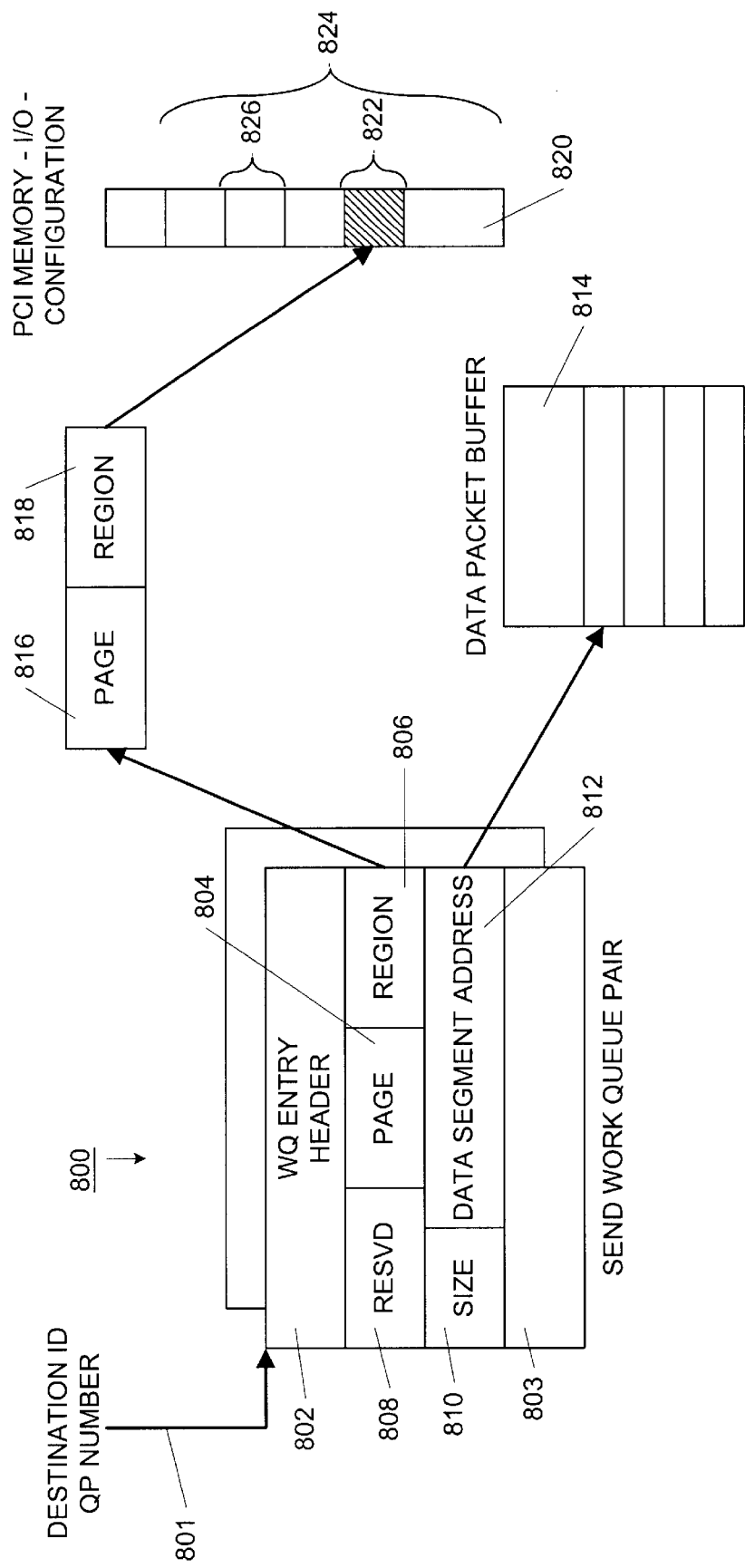
FIG. 8 is a block schematic diagram illustrating the use of work queue entries to reference a particular region of PCI device address space for a SEND operation.

FIGS. 7 and 8 illustrate an example using an InfiniBand SEND operation to perform PIO access on a selected PCI device. In FIG. 7, the process starts in step 700 and proceeds to step 702. In step 702, work queue entries are initialized with the desired addresses and data segments to reflect the device address requirements and the number of pages needed to support the PCI device I/O and config address spaces.

For example, in FIG. 8, work queue entries 800 are initialized as stated above for PCI bus PIO operations. A particular work queue entry 803 is identified by a destination ID and queue pair number as indicated by arrow 801. The work queue entry 803 includes a conventional header 802 and an embedded address, including a page ID 804 and a region ID 806. The remainder of the work queue entry word is reserved 808. The work queue entry 803 also contains a size variable 810 which indicates the size of the data transfer and a pointer 812 to a buffer location 814 where data packets containing the data to be transferred are stored. These data packets are placed into the buffer 814 by the device driver.

In step 704, the work queue 800 that has been assigned to process PCI bus PIO is selected by the nexus driver to process a SEND request by using the IB destination ID and QP number 801. The PIO PCI address is included in fields 804 and 806 and the data packet is sent to the InfiniBand-PCI bridge. Next, in step 706, the bridge issues a PCI transaction to the PCI Bus using the address embedded in the data packet. The PCI data burst size to the PCI I/O and config address spaces is limited to 8 bytes. The PCI memory, I/O and config address space 820 is arranged with a contiguous area 824 that is assigned to segments. Each segment is mapped to a page in the PCI address. Each segment is further subdivided into regions. One of the segments is selected using the page ID 814. Within that segment are a plurality of regions, such as region 826. One of the regions 822 is selected by using the region ID 818.

In step 708, the device driver checks to see whether all of the data bytes have been sent by checking the size variable 810 in the data packet. If all of the data bytes have not been sent, the process returns to step 708. Once the size is exhausted in the work queue entry, the transfer stops in step 712.

Figure 9:
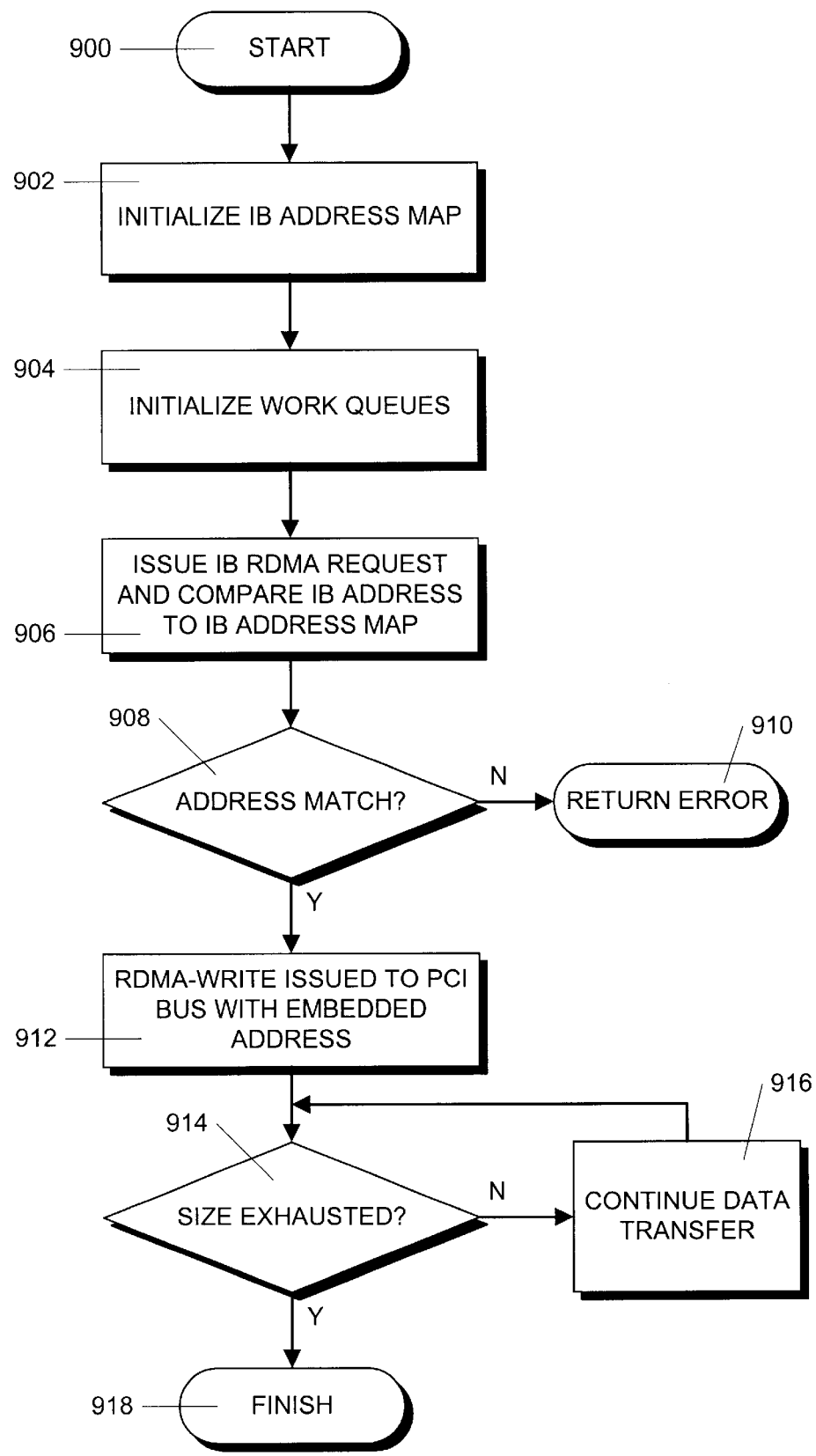
FIG. 9 is a flowchart illustrating the implementation of a PIO write from a PCI device register using work queue entries to perform an InfiniBand RDMA-WRITE operation.
Figure 10:
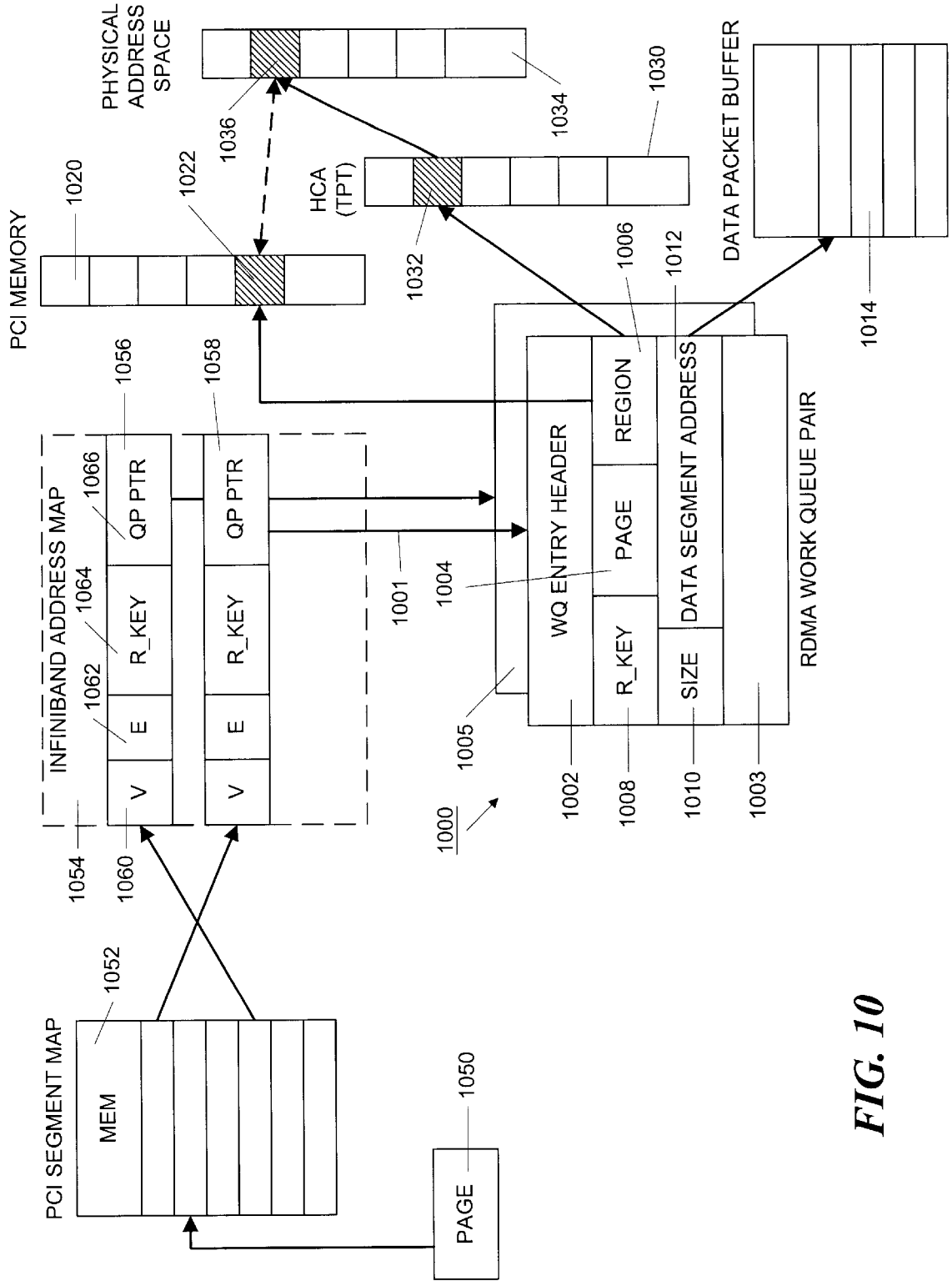
FIG. 10 is a block schematic diagram illustrating the use of work queue entries to reference a particular region of PCI device address space for an RDMA-WRITE operation.

FIGS. 9 and 10 illustrate an example of using the InfiniBand RDMA-WRITE process to perform a PIO write. The process begins in step 900 and proceeds to step 902 in which an InfiniBand address map is initialized and step 904 in which work queue entries are initialized with the desired addresses and data segments to reflect the devices addressing requirements, the number of pages needed to support the PCI device memory, I/O and config address space, and pointers to the data packet buffers.

The InfiniBand$^{SM}$ address map 1054 associates work queue entries, such as entries 1003 and 1005 with regions in the PCI address space 1020. The InfiniBand address map 1054 is a data structure that is stored locally in the HCA and has a plurality of entries of which entries 1056 and 1058 are shown. Each entry is associated with a region in the PIO address space and holds the initial segment address for each region that is mapped into the system virtual memory address space, through a translation and protection table (TPT) in the host channel adapter as described below. 1062. Each table entry, such as entry 1056 has a valid flag 1060 and an error flag 1062. Flags 1060 and 1062 mark entry 1056 as valid or in error. If the error flag 1062 is set, it means an error was returned because the entry 1056 did not map correctly into a TPT entry in the host channel adapter. The entry also includes an R-Key 1064 that is used in the TPT-address translation. Each address map entry 1056 also includes a pointer 1066 to the work queue assigned to the PCI segment. One entry in this work queue is required for each PCI address region that will be referenced by device drivers. Every work queue has an entry in this map.

Figure 11A:
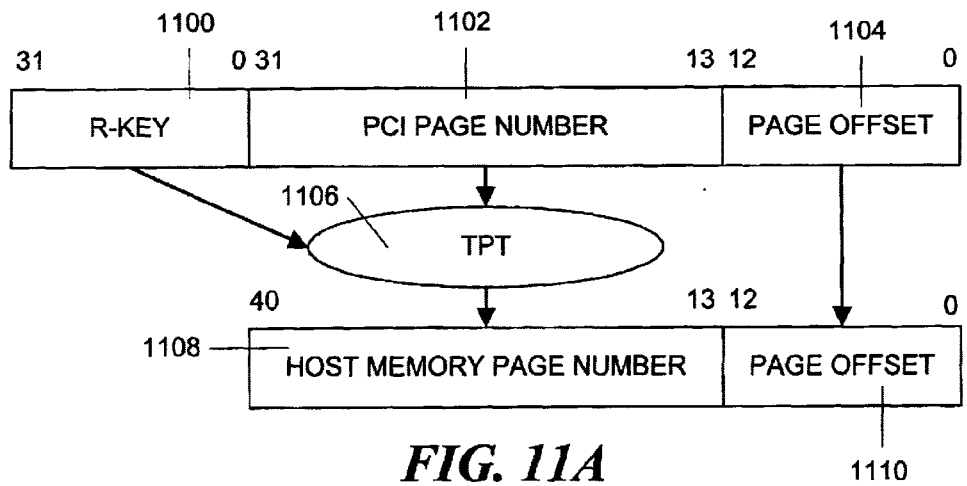
FIG. 11A is a schematic illustration of a mapping between the PCI address space and the host virtual memory space.
Figure 11B:
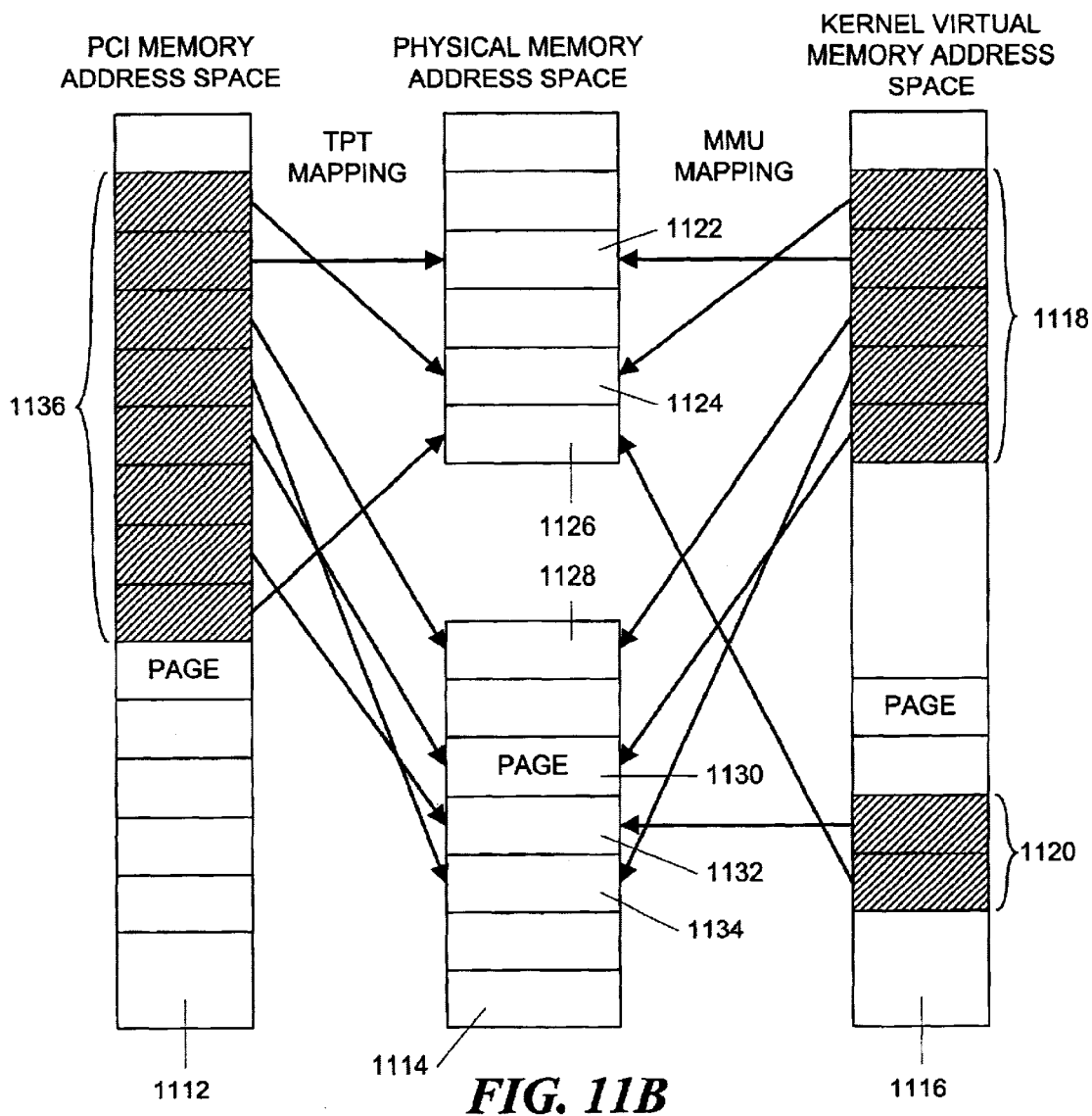
FIG. 11B is a schematic diagram illustrating how a PCI memory address referenced in the kernel memory address space is translated into a physical storage location and how the same address in the PCI memory address space is translated into the physical storage location by the translation and protection table.

The map defines a translation between the PCI address and a physical memory address to which that PCI address is mapped. This mapping is illustrated in FIGS. 11A and 11B. As shown in FIG. 11A a 32-bit PCI address is translated into a 40-bit host virtual memory address by the translation and protection table mechanism. In particular, the PCI address is comprised of a 13-bit page offset 1104 and a 19-bit PCI page number 1102. The 13-bit PCI page offset 1104 is used as the host memory page offset 1110 as shown in FIG. 11A. The host page number is generated using the PCI page number 1102 and the translation and protection table 1106. The translation and protection table 1106 receives as inputs the PCI page number 1102 and a 32-bit Remote Key or R-Key which is used by the HCA to select appropriate page tables for translating virtual memory addresses to physical memory addresses. This R-Key is assigned at the time the nexus driver reserves memory space for the PCI PIO operations. The R-Key 1100 and the PCI page number are used by the translation and protection table 1102 to generate the host memory page number 1108.

The results of this translation are illustrated in FIG. 11B which shows the relationship of the PCI memory address space 1112, the physical memory address space 1114 and the kernel virtual memory address space 1116. For example, five contiguous pages 1118 and two contiguous pages 1120 in the kernel memory space 1116 are mapped to pages 1122–1134 in the physical memory address space 1114 by a conventional memory management unit (not shown.) Note that the pages 1118 and 1120 are contiguous, the pages 1122–1134 in the physical memory address space 1114 may, or may not be contiguous. In a similar manner, contiguous pages 1136 in the PCI memory address space 1112 are mapped by the aforementioned TPT mapping mechanism into the same physical memory address space pages 1122–1134.

In FIG. 10, work queues 1003 and 1005 are initialized as stated above for PCI bus PIO operations. A WQE on work queue 1003 includes a conventional header 1002 and an embedded address including an R-Key 1008, a page ID 1004 and a region ID 1006. The work queue entry 1003 also contains a size variable 1010 which indicates the size of the data transfer and a pointer 1012 to a buffer location 1014 where data packets containing the data to be transferred are stored. These data packets are placed into the buffer 1014 by the device driver.

In step 906, an InfiniBand RDMA-WRITE request is issued by the nexus driver. This request results in the PCI address being used to index the InfiniBand address map 1054. In particular the page ID portion of the PCI address 1050 is used to access a PCI segment map 1052 that maps the page ID to a segment. If the PCI address matches an entry in the segment map 1052 in step 908, the corresponding InfiniBand address table entry contents are returned. If not, the process completes in step 910. The returned information contains the work queue entry pointer 1001 that designates the work queue entry to use for this RDMA-WRITE request. The value returned from the InfiniBand address map also includes the R-Key 1008 that is concatenated with the PCI address (page ID 1004 and region ID 1006) and pushed into the work queue entry pair 1000.

In step 911, the work queue pair 1000 that has been selected to process the PIO write request issues an RDMA-WRITE request to the virtual address specified by the R-key 1064, the page ID 1004 and the region ID 1006. Since this address is mapped to the PCI bus, the RDMA-WRITE request is issued to the PCI bus with the embedded page and region IDs that correspond to the PCI PIO address space.

As discussed above, the PCI memory, I/O and config address space 1020 is arranged with a contiguous area that is assigned to segments. One of the segments is selected using the page ID 1004. Within that segment are a plurality of regions and one of the regions 1022 is selected by using the region ID 1006. The location 1036 in physical memory 1034 which corresponds to the selected region 1022 in PCI address space 1020 is determined by using the PCI address in the work queue entry 1003 concatenated with the R-Key 1008 as a key into the TPT 1030 in the host channel adapter. The value 1032 that is returned from this table 1030 references the correct location 1036 in physical memory 1034 to which the PCI PIO address space has been mapped.

In step 914, a check is made to see whether all of the data bytes have been sent. If all of the data bytes have not been sent, the data transfer continues in step 916 and the process returns to step 914. Once the size is exhausted in the work queue entry, the transfer stops in step 918.

Figure 12:
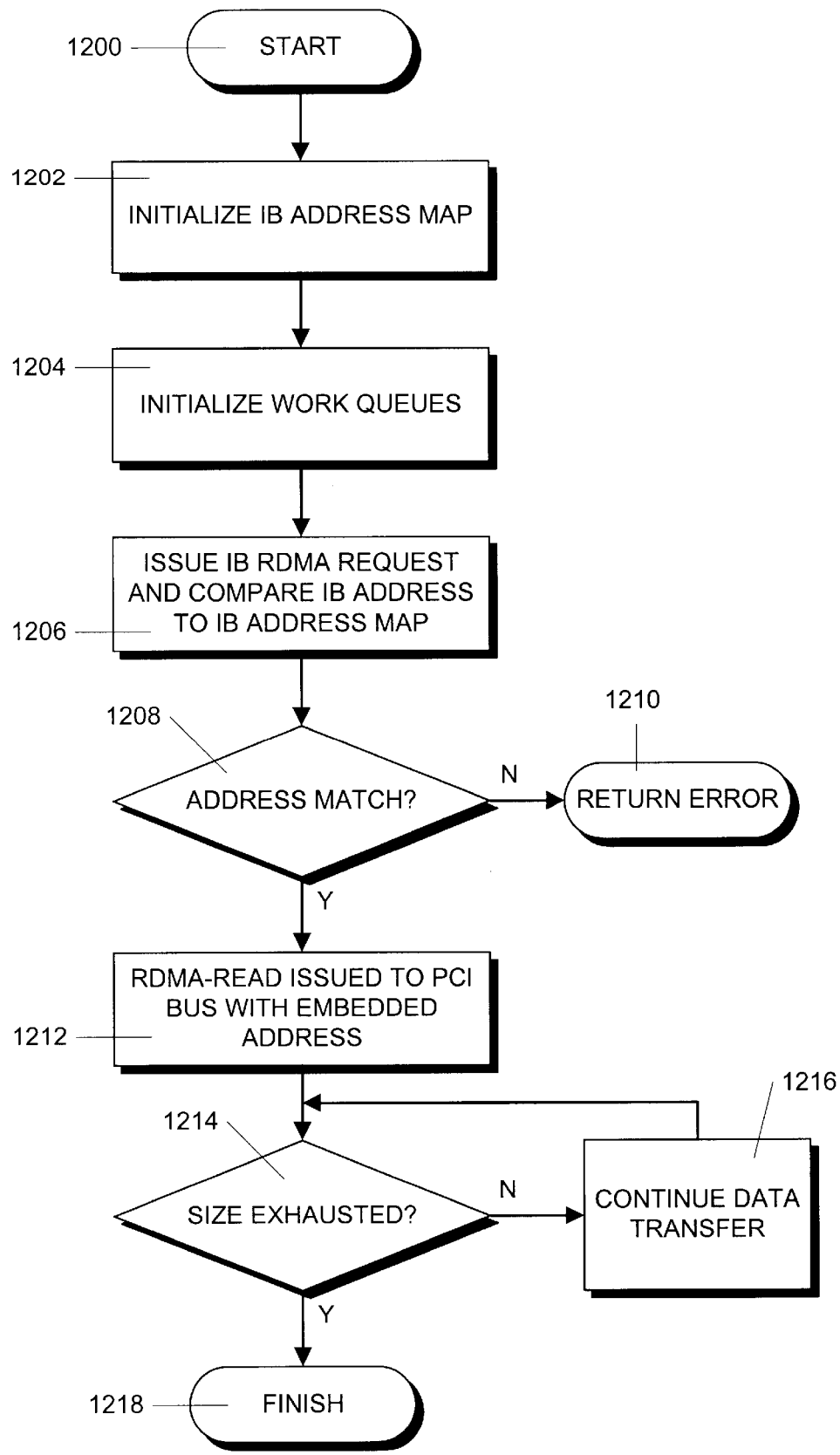
FIG. 12 is a flowchart illustrating the implementation of a PIO read from a PCI device register using work queue entries to perform an InfiniBand[SM] RDMA-READ operation.
Figure 13:
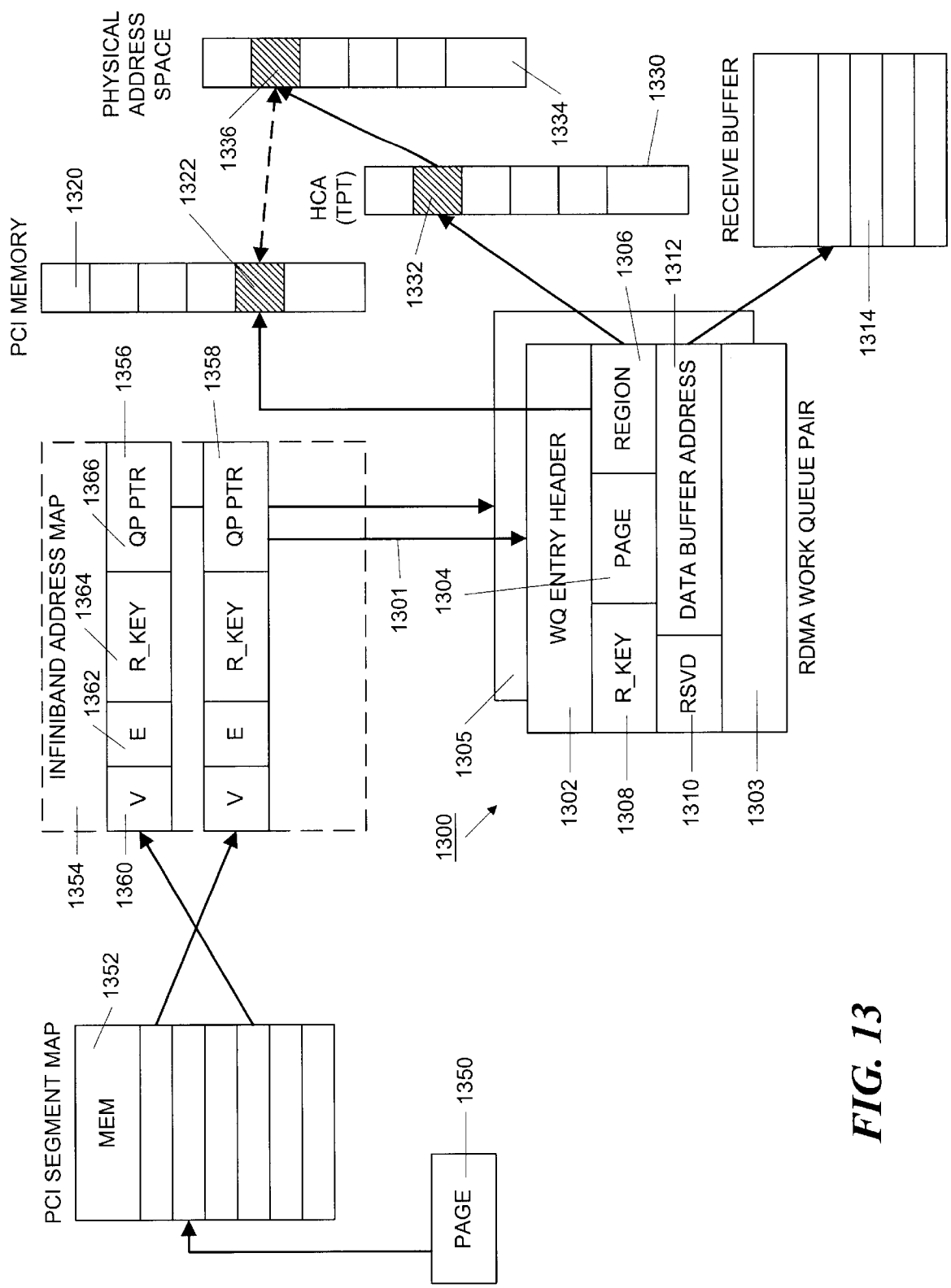
FIG. 13 is a block schematic diagram illustrating the use of work queue entries to reference a particular region of PCI device address space for an RDMA-READ operation.

FIGS. 12 and 13 illustrate an example of using the InfiniBands$^{SM}$ RDMA-READ process to perform a PIO read. The process begins in step 1200 and proceeds to step 1202 in which an InfiniBand$^{SM}$ address map is initialized and step 1204 in which work queue entries are initialized with the desired addresses to reflect the devices addressing requirements, the number of pages needed to support the PCI device memory, I/O and config address space, and pointers to the buffers that will receive the data returning from the PIO read.

In FIG. 13, work queues 1303 and 1305 are initialized as stated above for PCI bus PIO operations. A WQE on work queue 1303 includes a conventional header 1302 and an embedded address including an R-Key 1308, a page ID 1304 and a region ID 1306. The work queue entry 1303 also contains a pointer 1312 to a buffer location 1014 where data packets containing the data returned from the PCI device will be stored.

In step 1206, an InfiniBand$^{SM}$ RDMA-READ request is issued by the nexus driver. This request results in the PCI address being used to index the infiniBand$^{SM}$ address map 1354. In particular the page ID portion of the PCI address 1350 is used to access a PCI segment map 1352 that maps the page ID to a segment. If the PCI address matches an entry in the segment map 1352 in step 1208, the corresponding InfiniBand$^{SM}$ address table entry contents are returned. If not, the process returns an error in step 1210. The returned information contains the work queue entry pointer 1301 that designates the work queue entry to use for this RDMA-READ request. The value returned from the InfiniBand$^{SM}$ address map also includes the R-Key 1308 that is concatenated with the PCI address (page ID 1304 and region ID 1306) and pushed into the work queue entry pair 1300.

In step 1211, the work queue pair 1300 that has been selected to process the PIO write request issues an RDMA-READ request to the virtual address specified by the R-key 1308, the page ID 1304 and the region ID 1306. Since this address is mapped to the PCI bus, the RDMA-READ request is issued to the PCI bus with the embedded page and region IDs that correspond to the PCI PIO address space.

In step 1214, data is received from the PCI device. If the data exceeds the maximum allowed packet size, multiple data packets may be received. Once the data has been received, the transfer stops in step 1218.

In order to meet the criteria imposed by system memory coherency requirements, several different rules must be observed for delayed completion of PCI PIO operations. These rules are described in Table 1.

TABLE 1

| Rule | Syntax | Description |
| --- | --- | --- |
| S1 | (Wr(A0,D0);) Rd(A0); Wr(A0,D1) | Read then Write to same address A0, Read always returns data D0. |
| S2 | Wr(A0,D0); Wr(A0,D1) | Write then Write to the same address A0 always ends with data D1 of second Write. |
| S3 | Wr(A0,D0); Flush; Wr(A1,D1) | Any/all Writes to any address A0, preceding the flush command must complete before the status Write to A1 completes. |
| C3 | Wr(A0,D0); Wr(A1,D1); | Write to Write order. Data D0 must be visible at address A0, before data D1 is visible at address A1. |
| C4 | Rd(A0); Rd(A1); | Read to Read order. Read of A0 must complete before Read of A1. |
| C5 | Rd(A0); Wr(A1,D1); | Read to Write order. Read of A0 must complete before Write of A1. |
| C6 | Wr(A0,D1); Rd(A1); | Write to Read order. Write of A0 must complete before Read of A1. |
| C7 | Wr(A0,D0); Wr(A1,D1); | Interrupts follow all rules of Writes. Interrupts are another form of DMA Write. |
| PC8 | PIO | Strong order, per memory or I/O space, known by transaction command/address bus. |

Tables 2 and 3 specify ordering rules for the InfiniBand-PCI bridge for both PIO and DMA transactions (discussed below), respectively. These latter tables are read as follows:

A({c,s}x) means transaction X on the vertical axis, is always ordered with respect to a subsequent transaction Y on the horizontal axis by rule {c,s},x. F({c,s}x) means transaction X on the vertical axis, is ordered with respect to a subsequent transaction Y on the horizontal axis by rule {c,s},x only if there is an intervening Flush command between transaction X and transaction Y.

TABLE 2

| PIO Rules | PIO-Read Y | PIO-Write Y |
| --- | --- | --- |
| PIO-Read X | A(PC8) | A(PC8) |
| PIO-Write X | A(PC8) | A(PC8) |

This table indicates that PIO that is non-cacheable and has a potential for unexpected results, as discussed above, has to be handled as strongly ordered. More specifically, the table indicates that previous PIO Writes must be completed as PCI writes before PIO Read data is returned. This is an indication that the PCI device which has been written has absorbed the write data without error so that the previous PIO Write is considered complete by the PCI device.

Figure 14:
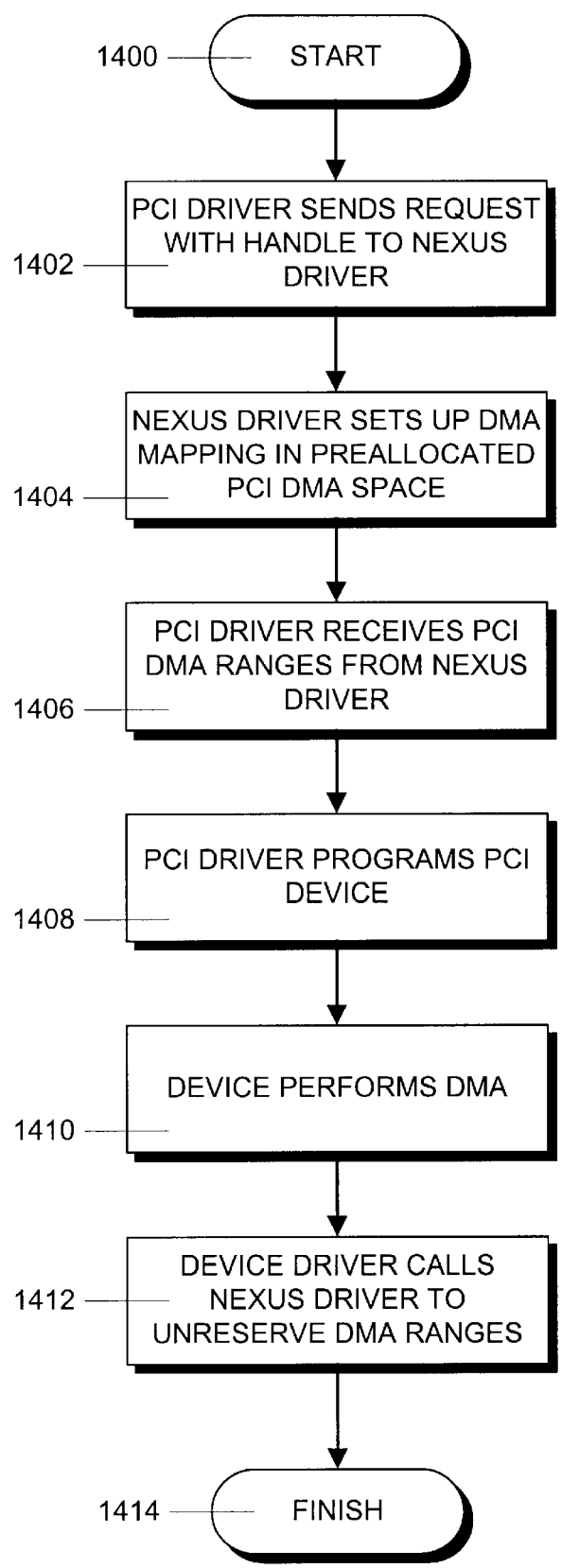
FIG. 14 is a flowchart illustrating steps performed by software during a PCI DMA transfer using an InfiniBand RDMA operation.

In accordance with the principles of the invention, the same address mapping arrangement can be used with DMA data transfers. FIG. 14 shows an overall view of the DMA process. The nexus driver associated with the InfiniBand-PCI bridge will allocate an area of PCI address space for DMA operations in both the InfiniBand-PCI bridge and the translation and protection table in the host channel adapter. The nexus driver may allocate one large chunk of memory of the PCI address map, or the nexus driver may allocate memory piecemeal as more space is needed by devices attached to the bridge. Along with specifying the size of each memory chunk, that region will further be described by whether it needs to support pre-fetching for RDMA-READS from the device and will be assigned a corresponding R-Key.

The process starts in step 1400 and proceeds to step 1402 where the PCI driver makes a request that contains a memory "handle" to the nexus driver. The handle contains information which the nexus driver uses to setup DMA mapping ranges in the allocated PCI DMA space as noted in step 1404. The DMA mappings for each device are setup so that no two devices share the same page mapping into memory. Next, in step 1406, the nexus driver sends the DMA address ranges to the PCI driver and, in step 1408, the PCI driver uses the PCI DMA ranges returned by the nexus driver to program the PCI device for the DMA transfer.

The device performs the DMA transfer in step 1410. A queue pair may be allocated in the InfiniBand-PCI bridge to support the DMA stream into, or from, memory. The DMA transfer is conducted as described below as a series of InfiniBand RDMA-READs or RDMA-WRITEs. In step 1412, the device driver releases the DMA mappings by calling the nexus driver to unreserve the range in the PCI DMA map allocated for that device. The process then terminates in step 1414.

Figure 15A:
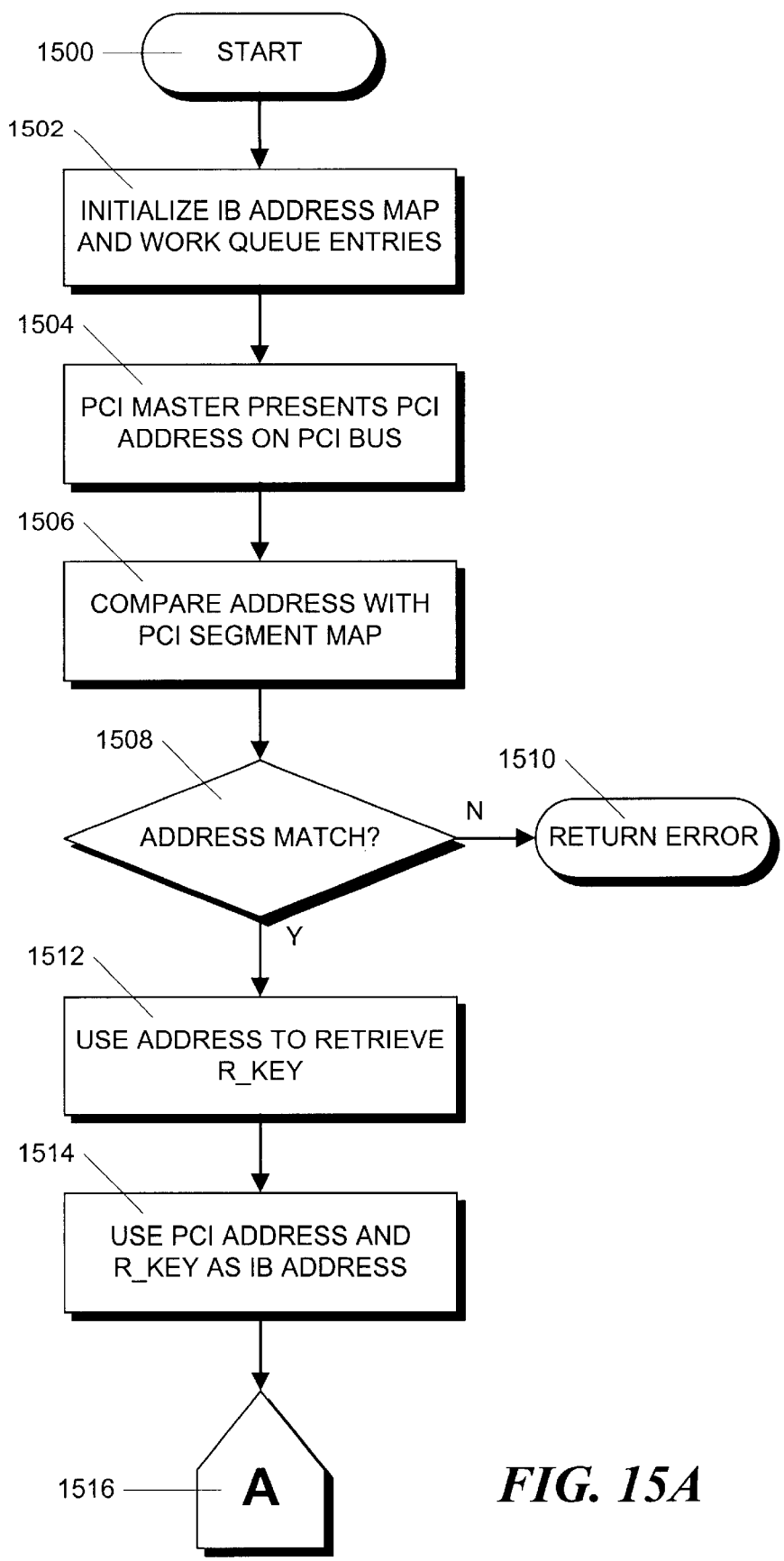
FIGS. 15A and 15B, when placed together, form a flowchart illustrating the implementation of a DMA transfer using work queue entries to perform an InfiniBand RDMA operation.
Figure 15B:
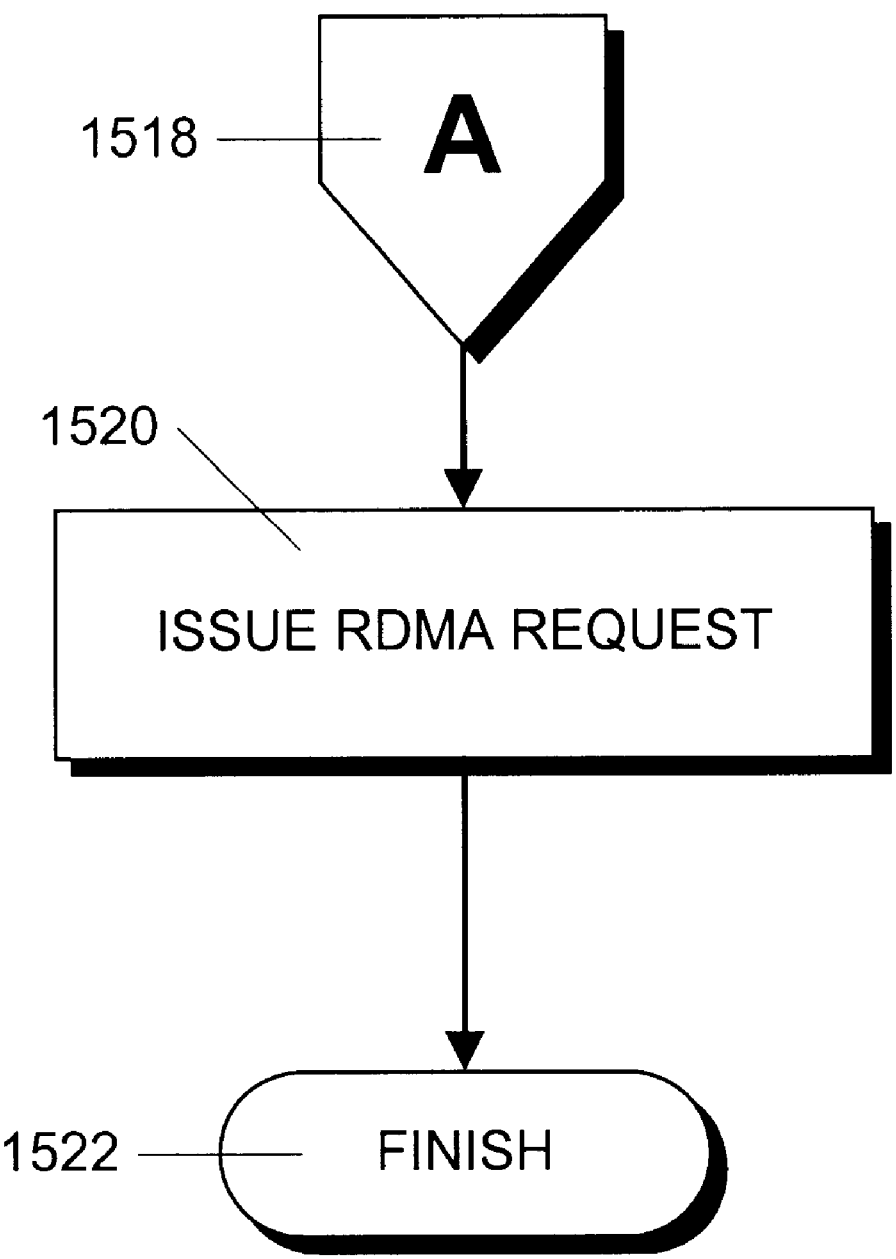
Figure 16:
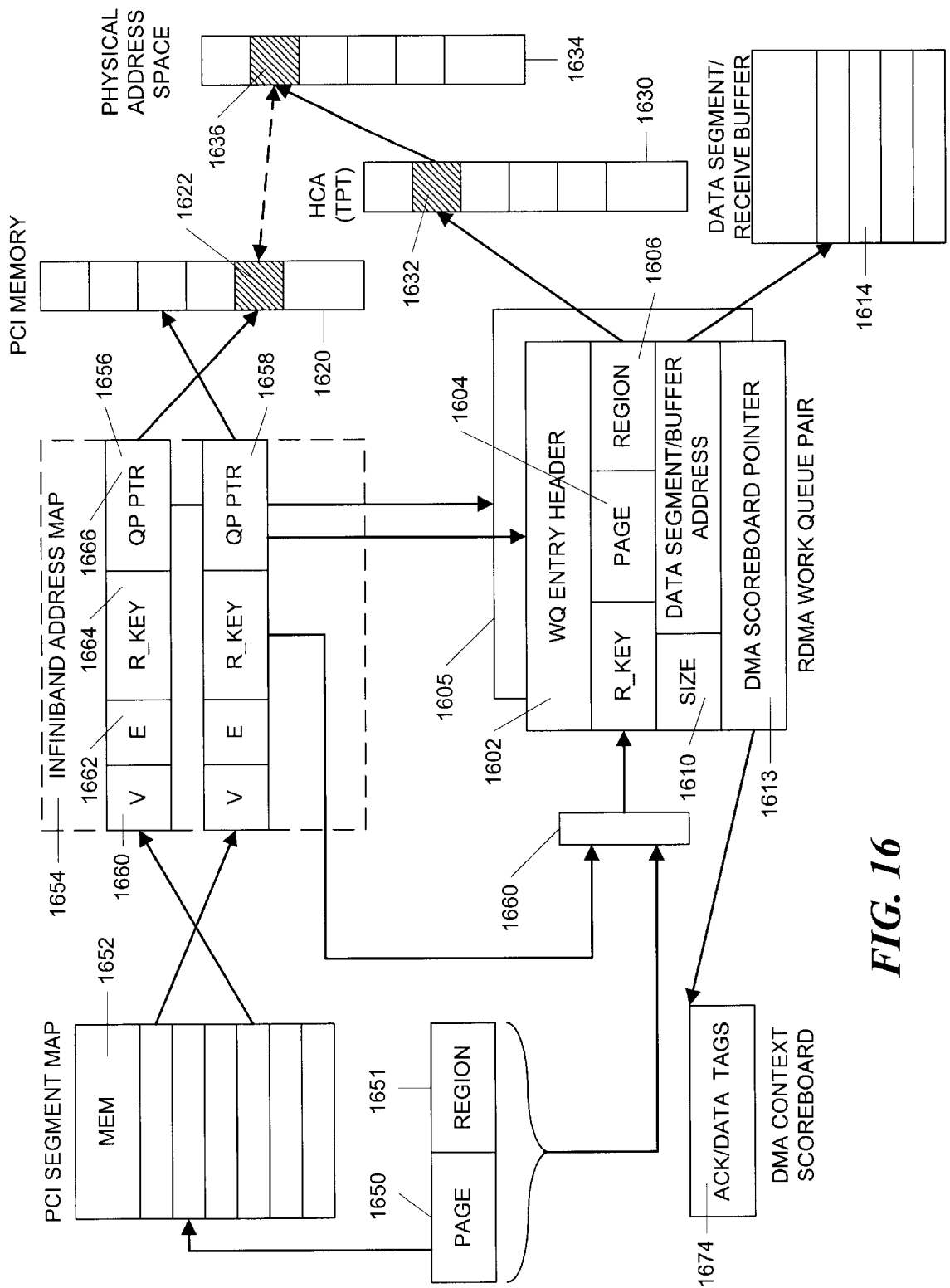
FIG. 16 is a block schematic diagram illustrating the use of work queue entries to reference a particular region of PCI device address space for an RDMA operation.

Mapping of the PCI device address space into InfiniBand address space usable for InfiniBand transit is accomplished using work queue pairs and work queue entries as illustrated in FIGS. 15A, 15B and 16. The InfiniBand$^{SM}$ address space then is mapped into the system virtual address space by the host channel adapter.

FIGS. 15A and 15B, when placed together form a flowchart illustrating details of the DMA process. FIG. 16 illustrates the process schematically. Many elements in FIG. 16 correspond to those in FIGS. 10 and 12 and are labeled with a corresponding number. For example, the work queues 1000 in FIG. 10 correspond to work queues 1600 in FIG. 16. The description of FIG. 10 elements applies to the corresponding elements in FIG. 16.

The process starts in step 1500 and proceeds to step 1502 in which work queue entries 1600 are initialized as discussed above for PCI bus PIO operations. A particular work queue entry 1603 is identified by a destination ID and queue pair number as indicated by arrow 1601. The work queue entry 1603 includes a conventional header 1602 and an embedded address including an R-Key 1608, a page ID 1604 and a region ID 1606. The work queue entry 1603 also contains a size variable 1610, which indicates the size of the data transfer and a pointer 1612 to a buffer location 1614. In the case of an RDMA-WRITE, this buffer is the location where data packets containing the data to be transferred are stored. These data packets are placed into the buffer 1614 by the PCI device driver. In the case of an RDMA-READ, this buffer will hold the returning DMA data.

The work queue entry 1603 also contains a pointer 1615 to a DMA scoreboard 1670. The DMA scoreboard 1670 is a data structure that holds the DMA context and tracks outstanding DMA requests and data returned from DMA requests to insure that data is returned from all outstanding requests. The DMA scoreboard 1670 contains data tags 1674 to trace outstanding DMA requests and tracks whether or not the data has been returned for DMA Reads or if ACK flags have been returned for DMA Writes.

In step 1504, a PCI master device presents a PCI address on the PCI bus in preparation for a DMA transfer. The PCI address consists of a page ID 1650 and a region ID 1651. The PCI DMA transaction is claimed on the PCI bus and the page ID 1650 is presented to a PCI segment map 1652 and compared to the entries in step 1506. If the PCI page address matches a valid PCI base address range in the PCI segment map 1652, in step 1508, the segment map maps the PCI address to an entry in the InfiniBand address map 1654. The selected entry is associated with a work queue, such as work queue 1600, and a work queue entry, such as entry 1603, is created in that queue for processing the RDMA request. Alternatively, if, in step 1508, no matching address range is found, the process terminates in step 1510 with an error.

If a matching address is found in step 1508, the process proceeds to step 1512 where the R-Key for the selected region is obtained from the InfiniBand address map entry. In step 1514, the R-Key 1608 and PCI address (page ID 1604 and offset 1606) are combined to form the InfiniBand address as indicated schematically by box 1660. In a preferred embodiment, the InfiniBand address could be created by forming a concatenation with the R-Key 1608 in the upper 32 bits and the PCI address in the lower 32 bits. Alternatively, the upper 32 address bits of the InfiniBand address could contain implementation-specific information as long as the lower 32 bits contain the PCI address. The process then proceeds, via off-page connectors 1516 and 1518, to step 1520 where an RDMA request is issued. The process then finishes in step 1522.

DMA transactions must be ordered with respect to the device on the PCI Bus. For strongly ordered transactions, address order is sufficient. I/O devices will perform properly with data given a strong address order. In addition, PCI byte accesses must stay byte aligned in the InfiniBand system. Consequently, no merging or coalescing of writes or reads is allowed for the InfiniBand-PCI bridge. Drivers and hardware synchronize by writing status to descriptors after block transfers to memory. If order is relaxed there is potential for a race condition in this case since the descriptor may be updated before the block transfer completes.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different arrangements can be used for the work queue entries. Other aspects, such as the specific process flow, as well as other modifications to the inventive concept are intended to be covered by the appended claims.

What is claimed is:

1. Apparatus for use in a computer system having a memory, the apparatus connecting a PCI device that accesses a PCI memory address space in the memory by means of a PCI address to a message passing queue-oriented bus architecture having work queues, and comprising:

a software driver in the memory that segments the PCI memory address space into a plurality of segments, each segment having at least one region therein;

a queue allocator that assigns a work queue to each PCI memory segment;

a PCI bridge that receives the PCI address from the PCI device and selects a work queue based on a first portion of the PCI address; and a transit mechanism that creates an entry on the selected work queue which entry contains the remainder of the PCI address.

2. The apparatus according to claim 1 wherein the remainder of the PCI address corresponds to the at least one region.

3. The apparatus according to claim 1 further comprising a device driver that selects a command work queue based on an address for a programmed I/O operation and wherein the PCI bridge comprises an extraction mechanism which extracts a PCI address from an entry on the command work queue and uses the extracted address to access a register in the PCI device.

4. The apparatus according to claim 1 wherein the memory has physical addresses and wherein the PCI address further comprises a region key that identifies a region in the memory assigned to PCI operations.

5. The apparatus according to claim 4 further comprising a translation protection table that translates the PCI address, including the region key, into a memory physical address.

6. The apparatus according to claim 1 further comprising an address table containing an entry for each work queue, the entry containing a region key and a pointer to the work queue.

7. The apparatus according to claim 6 further comprising a PCI segment map that selects an address table entry based on the first portion of the PCI address.

8. The apparatus according to claim 1 further comprising a buffer memory which holds data to be sent between the PCI device and the memory and wherein the work queue entry contain a pointer to the buffer memory.

9. The apparatus according to claim 8 wherein the PCI bridge places data into the buffer memory.

10. The apparatus according to claim 8 wherein a device driver places data into the buffer memory.

11. The apparatus according to claim 1 wherein the work queue entry contains a size variable that indicates the total amount of data to be transferred between the PCI device and the memory.

12. A method for use in a computer system having a memory, the method connecting a PCI device that accesses a PCI memory address space in the memory by means of a PCI address to a message passing queue-oriented bus architecture having work queues, and comprising:

(a) segmenting the PCI memory address space into a plurality of segments, each segment having at least one region therein;

(b) assigning a work queue to each PCI memory segment;

(c) receiving the PCI address from the PCI device and selecting a work queue based on a first portion of the PCI address; and (d) creating an entry on the selected work queue which entry contains the remainder of the PCI address.

13. The method according to claim 12 wherein the remainder of the PCI address corresponds to the at least one region.

14. The method according to claim 12 further comprising:

(e) selecting a command work queue based on an address for a programmed I/O operation; and (f) extracting a PCI address from an entry on the command work queue and uses the extracted address to access a register in the PCI device.

15. The method according to claim 12 wherein the memory has physical addresses and wherein the PCI address further comprises a region key that identifies a region in the memory assigned to PCI operations.

16. The method according to claim 15 further comprising:

(g) translating the PCI address, including the region key, into a memory physical address.

17. The method according to claim 12 further comprising:

(h) creating an address table containing an entry for each work queue, the entry containing a region key and a pointer to the work queue.

18. The method according to claim 17 further comprising:

(i) creating a PCI segment map that selects an address table entry based on the first portion of the PCI address.

19. The method according to claim 12 further comprising:

(j) creating a buffer memory to hold data to be sent between the PCI device and the memory and wherein the work queue entry contains a pointer to the buffer memory.

20. The method according to claim 19 further comprising:

(k) placing data into the buffer memory with the PCI bridge.

21. The method according to claim 19 further comprising:

(l) placing data into the buffer memory with a device driver.

22. The method according to claim 12 wherein the work queue entry contains a size variable that indicates the total amount of data to be transferred between the PCI device and the memory.

23. A computer program product for use in a computer system having a memory, the computer program product embodying code for connecting a PCI device that accesses a PCI memory address space in the memory by means of a PCI address to a message passing queue-oriented bus architecture having work queues, and comprising a computer usable medium having computer readable program code thereon, including:

program code for segmenting the PCI memory address space into a plurality of segments, each segment having at least one region therein;

program code for assigning a work queue to each PCI memory segment;

program code for receiving the PCI address from the PCI device and selecting a work queue based on a first portion of the PCI address; and program code for creating an entry on the selected work queue which entry contains the remainder of the PCI address.

24. A computer data signal for use in a computer system having a memory, the computer data signal embodying code for connecting a PCI device that accesses a PCI memory address space in the memory by means of a PCI address to a message passing queue-oriented bus architecture having work queues, and comprising:

program code for segmenting the PCI memory address space into a plurality of segments, each segment having at least one region therein;

program code for assigning a work queue to each PCI memory segment;

program code for receiving the PCI address from the PCI device and selecting a work queue based on a first portion of the PCI address; and program code for creating an entry on the selected work queue which entry contains the remainder of the PCI address.

\* \* \* \* \*